US012631485B2

(12) United States Patent
Paul et al.

(10) Patent No.: US 12,631,485 B2
(45) Date of Patent: May 19, 2026

(54) METHODS AND APPARATUS FOR AMBIENT LIGHT SENSOR WITH SPECTRAL RESOLUTION

(71) Applicant: QUALCOMM Incorporated, San Diego, CA (US)

(72) Inventors: Abhijeet Paul, San Diego, CA (US); Mishel Matloubian, San Diego, CA (US); Ravi Pramod Kumar Vedula, San Diego, CA (US); Periannan Chidambaram, San Diego, CA (US); Hyunchul Jung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 18/398,592

(22) Filed: Dec. 28, 2023

(65) Prior Publication Data

US 2025/0216250 A1      Jul. 3, 2025

(51) Int. Cl.
    *G01J 1/42*        (2006.01)
    *G01J 1/44*        (2006.01)
    *G01J 3/28*        (2006.01)

(52) U.S. Cl.
    CPC .............. *G01J 1/4204* (2013.01); *G01J 1/44* (2013.01); *G01J 3/28* (2013.01); *G01J 2001/446* (2013.01)

(58) Field of Classification Search
    CPC .... G01J 1/4204; G01J 1/44; G01J 3/28; G01J 200/446
    See application file for complete search history.

(56) References Cited

U.S. PATENT DOCUMENTS

| | | | |
|---|---|---|---|
| 8,829,332 B1 | 9/2014 | Roizin et al. | |
| 2009/0213256 A1* | 8/2009 | Kudoh ................. | H10F 39/802 |
| | | | 348/340 |

(Continued)

FOREIGN PATENT DOCUMENTS

| | | |
|---|---|---|
| CN | 110459641 A | 11/2019 |
| EP | 1833095 B1 | 8/2018 |
| JP | 2018082068 A | 5/2018 |

OTHER PUBLICATIONS

Baine P., et al., "Improved Thermal Performance of SOI Using a Compound Buried Layer", IEEE Transactions on Electron Devices, vol. 61, No. 6, Jun. 2014, May 2, 2014, pp. 1999-2006.

(Continued)

*Primary Examiner* — Georgia Y Epps
*Assistant Examiner* — Don J Williams
(74) *Attorney, Agent, or Firm* — Muncy, Geissler, Olds & Lowe, P.C.

(57) ABSTRACT

Methods and apparatus for ambient light sensor with spectral resolution are disclosed. In an aspect, an ambient light sensor comprises a photodiode having a light-facing surface comprising a first n-doped layer, a first p-doped layer disposed below and in contact with the first n-doped layer, a second n-doped layer disposed below and in contact with the first p-doped layer, and a second p-doped layer disposed below and in contact with the second n-doped layer. A junction between the first n-doped layer and the first p-doped layer forms a first vertical diode; a junction between first p-doped layer and the second n-doped layer forms a second vertical diode; and a junction between the second n-doped layer and the second p-doped layer forms a third vertical diode and a first lateral diode. Each of the diodes is most sensitive to a different range of light wavelengths than the other diodes.

26 Claims, 16 Drawing Sheets

(56)                    References Cited

U.S. PATENT DOCUMENTS

| 2010/0117126 | A1 | 5/2010 | Takahashi |
| 2012/0292675 | A1 | 11/2012 | Roizin et al. |
| 2018/0062017 | A1* | 3/2018 | Derkacs ............... H10F 19/902 |
| 2019/0198701 | A1 | 6/2019 | Moussy |
| 2025/0221057 | A1 | 7/2025 | Paul et al. |

OTHER PUBLICATIONS

International Search Report and Written Opinion PCT/US2024/060607 ISA/EPO Aug. 20, 2025.
Partial International Search Report—PCT/US2024/060607—ISA/EPO—May 21, 2025.
Richard C., et al., "CMOS Buried Quad p. n Junction Photodetector for Multi-wavelength Analysis", Optics Express, [Online] vol. 20, No. 3, Jan. 17, 2012, p. 2053 ,XP093274565, 9 Pages, p. 1-p. 4.

* cited by examiner

800
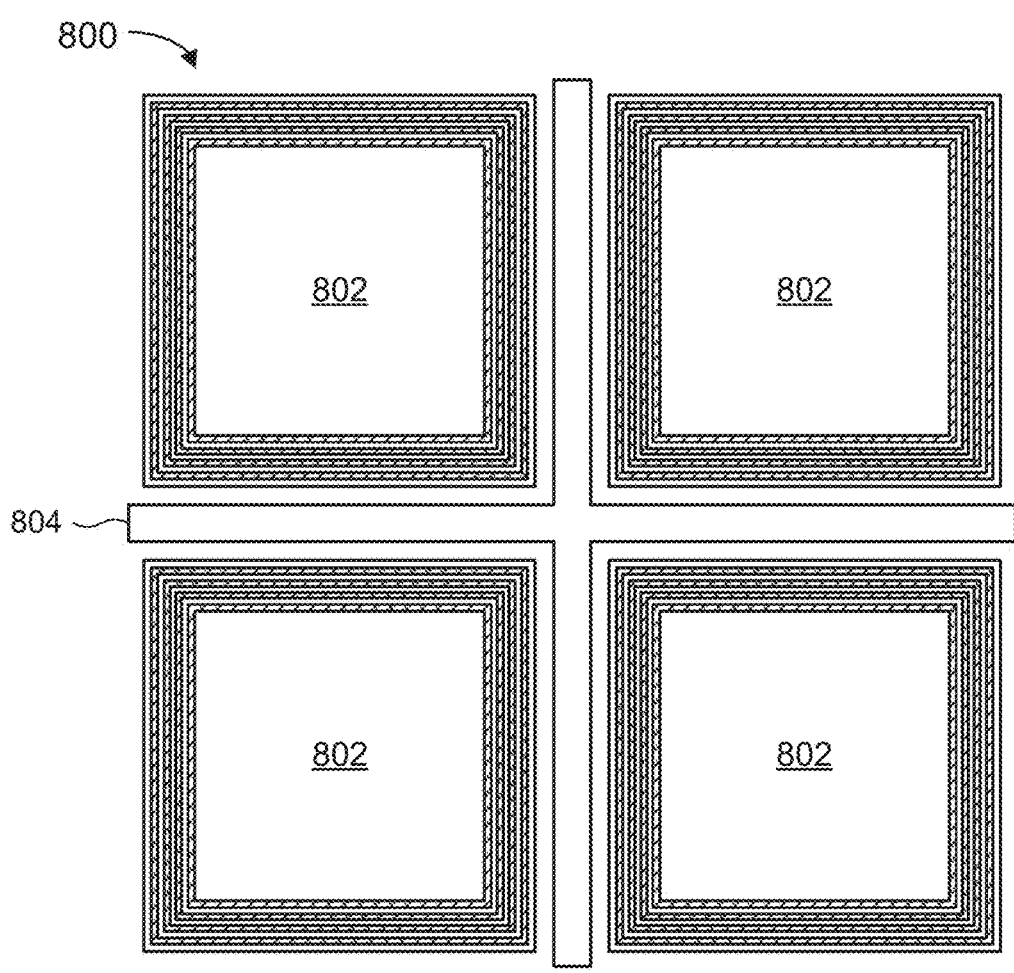
802
802
804
802
802
*FIG. 8A*
806
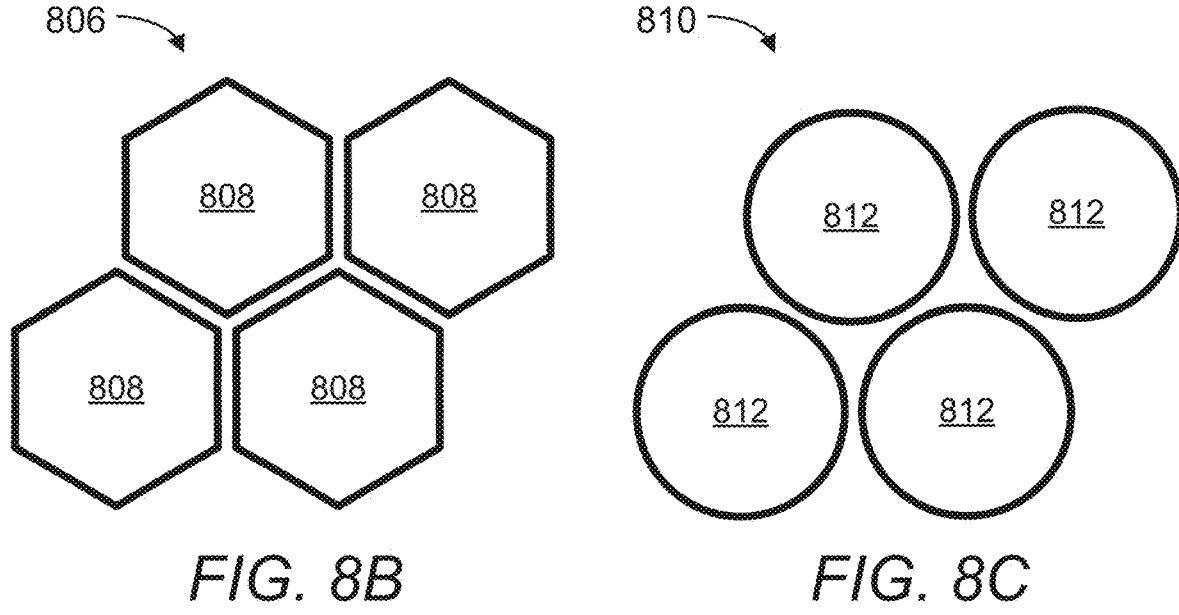
808
808
808
808
*FIG. 8B*
810
812
812
812
812
*FIG. 8C*

1400

1500

METHODS AND APPARATUS FOR AMBIENT LIGHT SENSOR WITH SPECTRAL RESOLUTION

BACKGROUND OF THE DISCLOSURE

1. Field of the Disclosure

Aspects of the disclosure relate generally to ambient light sensors, and particularly to ambient light sensors with spectral resolution (e.g., color detection) capability.

2. Description of the Related Art

An ambient light sensor (ALS) is a device that can measure the intensity, and optionally determine the spectral components of, ambient light. An ALS typically includes a photo-sensitive material, such as a photodiode, that produces a current in response to reception of photons on its sensing surface or surfaces. Determining the spectral components of ambient light, i.e., identifying which wavelengths (colors) of light are present in the ambient light typically requires the use of a filter that blocks all but a limited range of frequencies from reaching the surface of a photodiode. For example, an ALS may have a red filter over a first photodiode, a green filter over a second photodiode, and a blue filter over a third photodiode; the relative percentages of red, green, and blue light may be determined based on the relative output currents of the first, second, and third photodiode, respectively. However, such designs typically use multiple photodiodes— one for red, one for green, one for blue—as well as the materials and area needed for the filters. These multiple photodiodes and multiple filters take up valuable real estate on the ALS chip and can contribute to cost of the whole chip.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, an ambient light sensor includes a photodiode, comprising: a first n-doped layer; a first p-doped layer disposed below and in contact with the first n-doped layer; a second n-doped layer disposed below and in contact with the first p-doped layer; and a second p-doped layer disposed below and in contact with the second n-doped layer, wherein: a junction between the first n-doped layer and the first p-doped layer forms a first vertical diode; a junction between first p-doped layer and the second n-doped layer forms a second vertical diode; and a junction between the second n-doped layer and the second p-doped layer forms a third vertical diode and a first lateral diode.

In an aspect, an ambient light sensor includes a photodiode, comprising: a plurality of p-doped regions interleaved horizontally with a plurality of n-doped regions; an n-doped layer disposed below and in contact with the plurality of p-doped regions and the plurality of n-doped regions; and a p-doped layer disposed below and in contact with the n-doped layer, wherein: junctions between the plurality of p-doped regions and the plurality of n-doped regions form a first lateral diode; junctions between the plurality of p-doped regions and the n-doped layer form a first vertical diode; and a junction between the p-doped layer and the n-doped layer forms a second vertical diode and a second lateral diode.

In an aspect, an ambient light sensor includes a photodiode, comprising: a first plurality of p-doped regions interleaved horizontally with a first plurality of n-doped regions; and a second plurality of p-doped regions below and in contact with the first plurality of n-doped regions and interleaved with a second plurality of n-doped regions below and in contact with the first plurality of p-doped regions, wherein: junctions between the first plurality of p-doped regions and the first plurality of n-doped regions form a first lateral diode; junctions between the second plurality of p-doped regions and the second plurality of n-doped regions form a second lateral diode; junctions between the first plurality of p-doped regions and the second plurality of n-doped regions form a first vertical diode; and junctions between the second plurality of p-doped regions and the first plurality of n-doped regions form a second vertical diode.

In an aspect, an ambient light sensor includes a photodiode, comprising: a plurality of p-doped regions interleaved horizontally with a plurality of n-doped regions; and a p-doped layer disposed below and in contact with the plurality of p-doped regions and the plurality of n-doped regions; wherein: junctions between the plurality of p-doped regions and the plurality of n-doped regions form a lateral diode; and junctions between the plurality of n-doped regions and the p-doped layer form a vertical diode.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 4A, FIG. 4B, and FIG. 4C show normalized output currents of the multiple diodes of a compact photodiode with spectral resolution, for different frequencies and intensities of light, according to an aspect of the disclosure.

FIGS. 8A through 8C are plan views showing some of the other possible photodiode configurations, according to different aspects of the disclosure.

DETAILED DESCRIPTION

Figure 1:
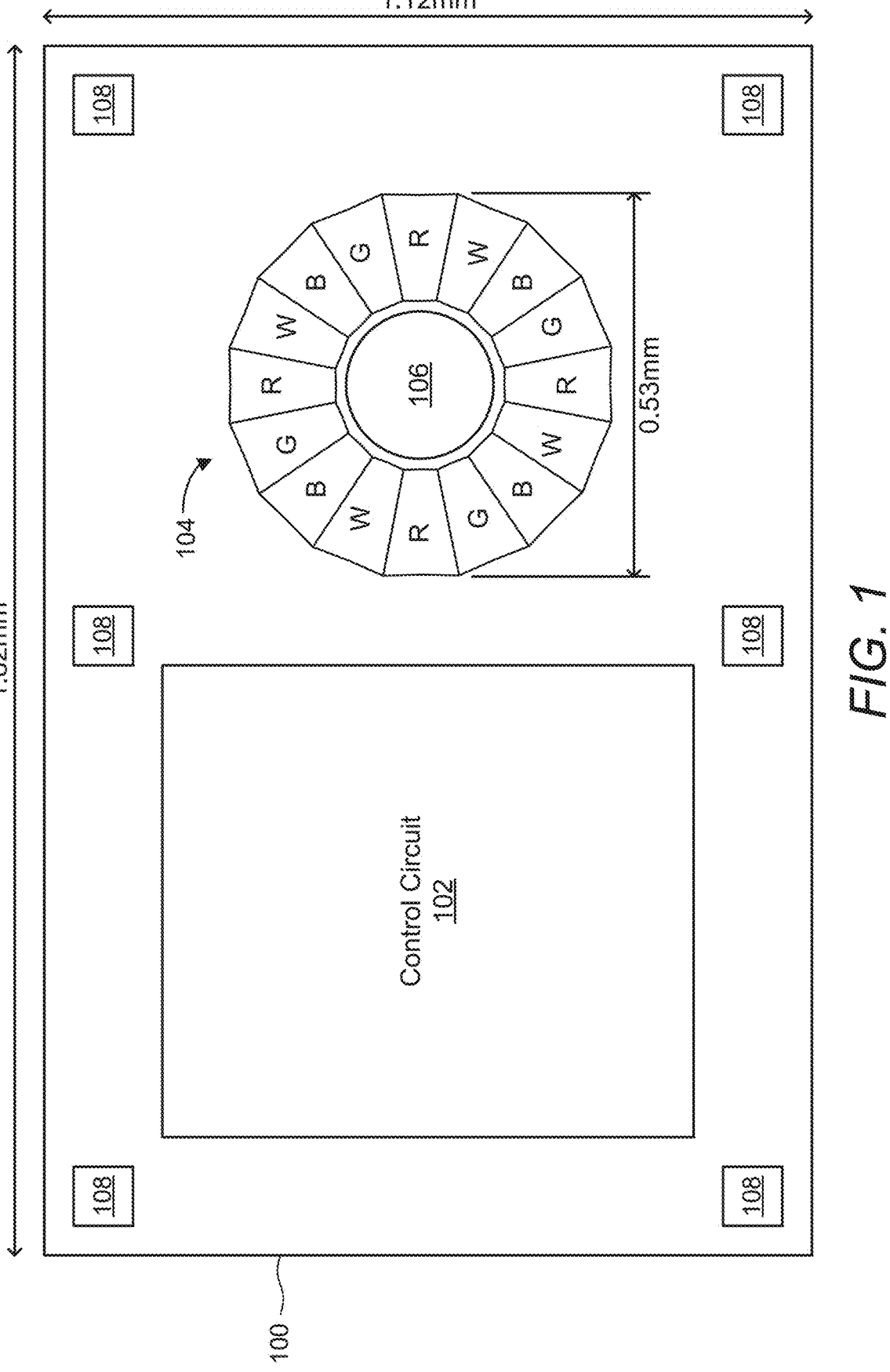
FIG. 1 is a plan view of a conventional ambient light sensor with color separation.

Methods and apparatus for ambient light sensor with spectral resolution are disclosed. In an aspect, an ambient light sensor comprises a photodiode having a light-facing surface comprising a first n-doped layer, a first p-doped layer disposed below and in contact with the first n-doped layer, a second n-doped layer disposed below and in contact with the first p-doped layer, and a second p-doped layer disposed below and in contact with the second n-doped layer, the bottom surface of the photodiode comprising a bottom surface of the second p-doped layer. A junction between the first n-doped layer and the first p-doped layer forms a first vertical diode; a junction between first p-doped layer and the second n-doped layer forms a second vertical diode; and a junction between the second n-doped layer and the second p-doped layer forms a third vertical diode and a first lateral diode. An ambient light intensity is determined based on a total of the currents produced by the first vertical diode, the second vertical diode, the third vertical diode, and/or the first lateral diode. An ambient light spectral component is determined based on a comparison of the currents produced by at least two of the first vertical diode, the second vertical diode, the third vertical diode, and/or the first lateral diode.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

An ambient light sensor (ALS) is commonly used in personal computers, handheld computing devices, display terminals, display screens, and other target devices, to detect the level of ambient light that the equipment is experiencing. The equipment may then adjust a display brightness up or down to adjust to the ambient light conditions reported by the ALS. Ambient light may be sensed using photodiodes, but large arrays are typically required for better sensitivity and on-chip color filters are typically required for spectral resolution (e.g., color detection). Both the large arrays and the on-chip color filters require larger dies and thus increase costs.

FIG. 1 is a plan view of a conventional ambient light sensor (ALS) 100 with color separation. The conventional ALS 100 is a 1.82 mm by 1.12 mm die that includes a control circuit 102 and a photodiode 104 having a set of color filters labeled according to their color, e.g., R (red), G (green), B (blue), and W (white), positioned around an unfiltered portion 106. The color filters are needed for proper color spectrum detection. Bonding pads 108 provide electrical connections to the ALS 100. In this example, the diameter of the photodiode with color filters is 0.53 mm and has an area of 0.22 mm$^2$, which is approximately 6% of the die area. The overall design is large, photodiode area is large, and the use of the color filters makes this design large and costly. Presented herein are methods and systems for integrating the light sensing and spectral resolution into one diode structure. This provides a low-cost, compact design for ambient light sensing.

Figure 2A:
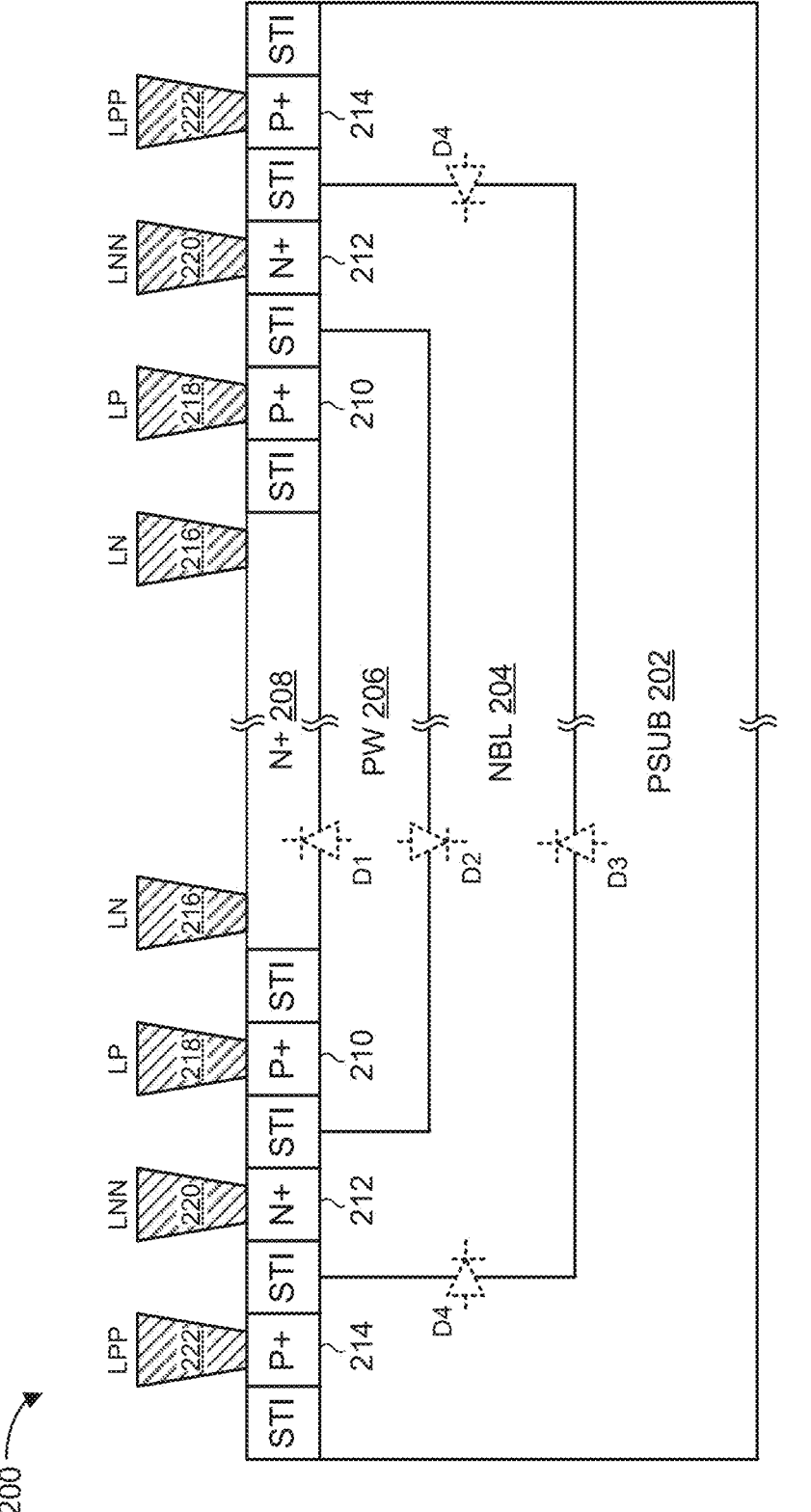
FIG. 2A and FIG. 2B are a cross-sectional view and a plan view, respectively, of a compact photodiode with spectral resolution, according to an aspect of the disclosure.
Figure 2B:
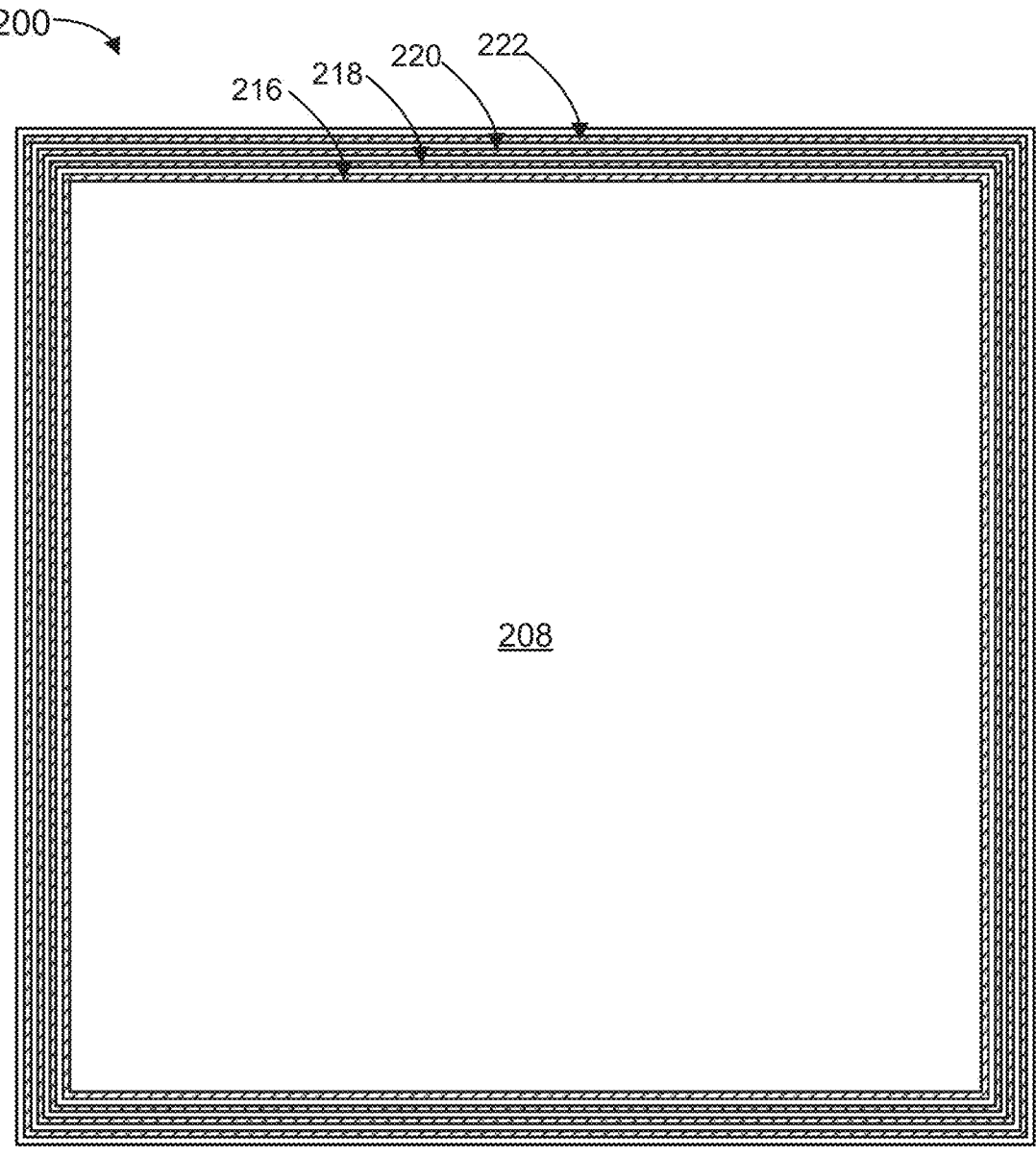

FIG. 2A and FIG. 2B are a cross-sectional view and a plan view, respectively, of a compact photodiode 200 with spectral resolution, according to an aspect of the disclosure. The photodiode 200 uses multiple-depth diodes, which give it spectral separation (e.g., R/G/B) without the need for color filters. Proper selection of PN junction parameters allows for good ambient light sensing in both indoor and outdoor light. The photodiode 200 can be fabricated without the need for additional process masks, and can be $\frac{1}{10}^{th}$ the size of the conventional photodiode 104, e.g., having a width of 50 um versus the 50 mm diameter of the conventional photodiode 104.

As shown in FIG. 2A, the photodiode 200 includes a p-doped substrate (PSUB) 202. Within the PSUB 202 is an n-doped buried layer (NBL) 204. Within the NBL 204 is a p-doped well (PW) 206. Above the PW 206 is a strongly n-doped (N+) layer 208. In the example shown in FIG. 2A, a strongly p-doped (P+) structure 210 is disposed around the perimeter of the top surface of the PW 206, a N+ structure 212 is disposed around the perimeter of the top surface of the NBL 204, and a P+ structure 214 is disposed around the perimeter of the top surface of the PSUB 202. In the example shown in FIG. 2A, the N+ layer 208, the P+ structure 210, the N+ structure 212, and the P+ structure 214 are separated from each other by shallow trench isolation (STI) structures.

In the example shown in FIG. 2A, a contact LN 216 is disposed around the perimeter of the top surface of the N+ layer 208, a contact LP 218 is disposed around the perimeter of the top surface of the P+ structure 210, a contact LNN 220 is disposed around the perimeter of the top surface of the N+ structure 212, and a contact LPP 222 is disposed around the perimeter of the top surface of the P+ structure 214.

In the example shown in FIG. 2A, a first diode (D1) is formed at the junction of the PW 206 and the N+ layer 208, and its terminals are contact LN 216 and contact LP 218. A second diode (D2) is formed at the junction of the PW 206 and the NBL 204, and its terminals are contact LP 218 and contact LNN 220. A third diode (D3) is formed at the junction of the PSUB 202 and the bottom surface of the NBL 204, a fourth diode (D4) is formed at the junction of the PSUB 202 and the sidewalls of the NBL 204, and their terminals are contact LNN 220 and LPP 222. FIG. 2B shows in more detail the shape and location of the N+ layer 208, the contact LN 216, the contact LP 218, the contact LNN 220, and the contact LPP 222. The entire structure is sensitive to ambient light.

During use, the photodiode 200 may be oriented so that the N+ layer 208 is the "light-facing" layer (i.e., closer to the source of the light than the other layers), in which case photons travel through the N+ layer 208 towards the PSUB 202. Thus, in some aspects, D1 is the light-facing diode, e.g., photons travel through D1 to get to D2, and through D2 to get to D3+D4. Alternatively, the photodiode 200 may be oriented so that the PSUB 202 is the light facing layer, in which case photons travel through the PSUB 202 towards the N+ layer. Thus, in some aspects, D3 and D4 are the light-facing diodes, e.g., photons travel through D3 and/or D4 to get to D2, and through D2 to get to D1.

In some aspects, D1 is most sensitive to light in a first range of wavelengths, D2 is most sensitive to light in a second range of wavelengths longer than the wavelengths in the first range of wavelengths, and D3 and D4 are most sensitive to light in a third range of wavelengths longer than the wavelengths in the second range of wavelengths. In some aspects, D1 is most sensitive to light in a first range of wavelengths, D2 is most sensitive to light in a second range of wavelengths shorter than the wavelengths in the first range of wavelengths, and D3 and D4 are most sensitive to light in a third range of wavelengths shorter than the wavelengths in the second range of wavelengths. These examples are illustrative and not limiting. In other aspects, each of the diodes D1, D2, D3, and D4 may be most sensitive to a different range of wavelengths than the other diodes. In some aspects, those different ranges of wavelengths may or may not overlap.

Figure 3:
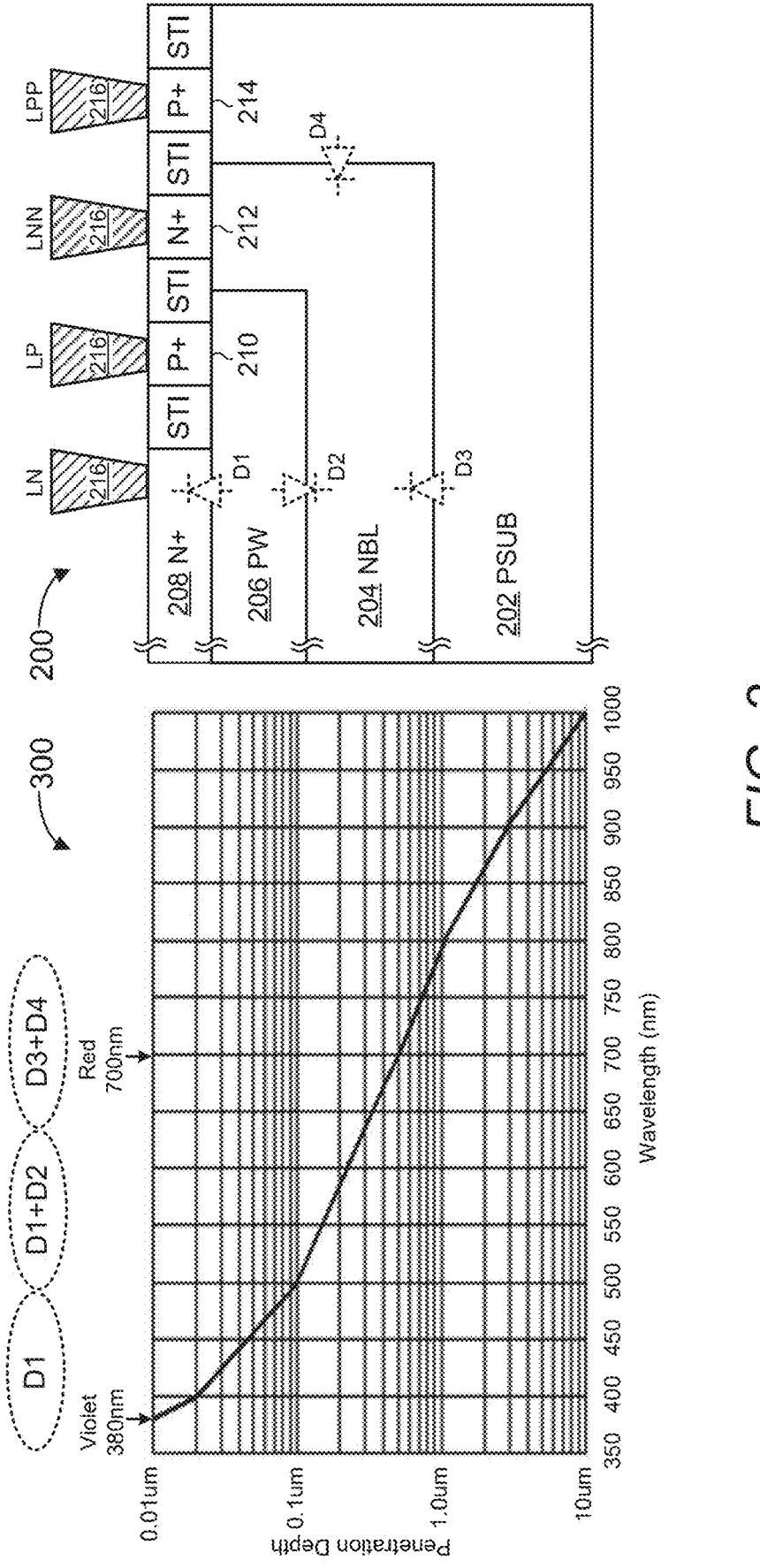
FIG. 3 is a graph showing penetration depth of light at various wavelengths into silicon, and a portion of a cross-section of a compact photodiode with spectral resolution, according to an aspect of the disclosure.

FIG. 3 is a graph 300 showing penetration depth of light at various wavelengths into silicon (on the left) next to a portion of a cross-section of the photodiode 200 (on the right), according to an aspect of the disclosure. As shown by the graph 300, violet light, which has a wavelength of 380 nm, has a penetration depth of only 0.01 um, while red light, which has a wavelength of 700 nm, has a penetration depth of 0.4 um. As a result, diode D1 will receive light across the entire visible spectrum, including red, green, and blue, but diode D2 will receive less blue light, and diode D3 will receive less green and blue light.

Figures 4A, 4B, 4C:
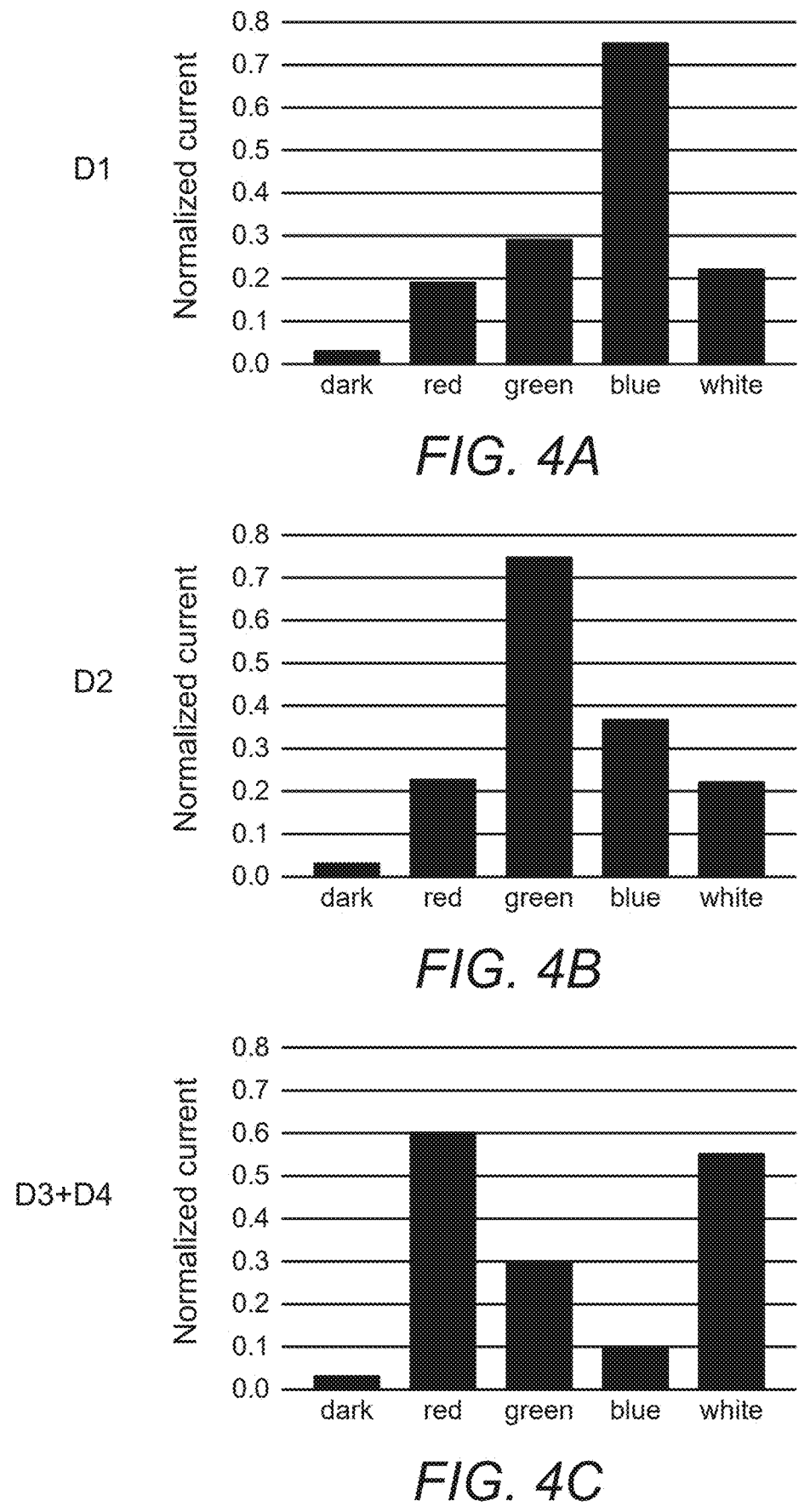

FIG. 4A, FIG. 4B, and FIG. 4C show normalized output currents of D1, D2, and D3+D4, respectively, for different frequencies and intensities of light, according to an aspect of the disclosure. As shown in FIG. 4A, D1 is most sensitive to blue light. As shown in FIG. 4B, D2 is most sensitive to green light. As shown in FIG. 4C, D3 and D4 are most sensitive to red light. Thus, the color components of ambient light can be determined based on a comparison of the currents obtained from each of the diodes D1, D2, and D3+D4.

Figure 5:
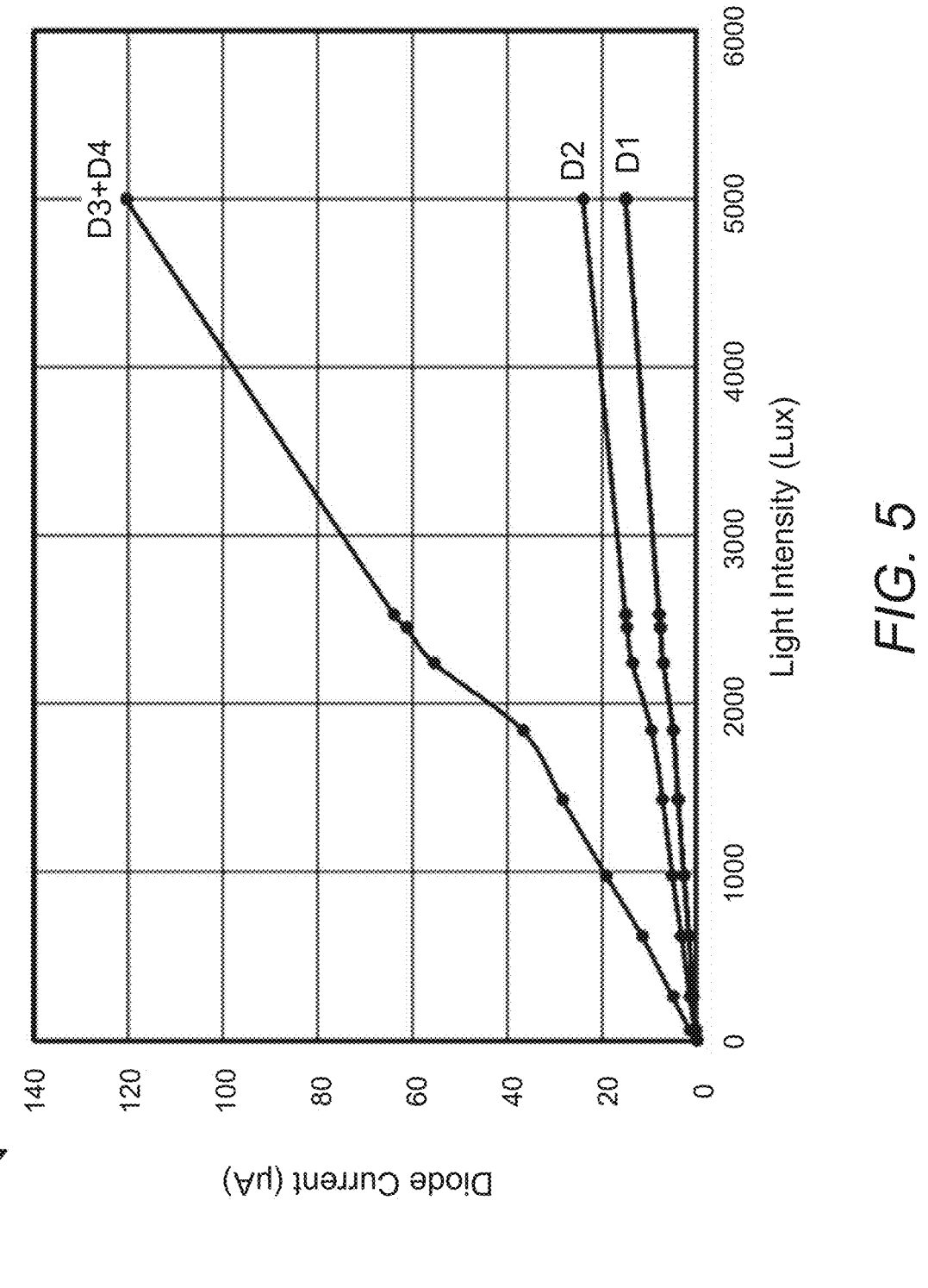
FIG. 5 is a graph showing the diode output currents for the multiple diodes of a compact photodiode with spectral resolution over a range of ambient light intensity, according to an aspect of the disclosure.

FIG. 5 is a graph 500 showing the diode output currents for D1, D2, and the combination of D3 and D4, over a range of ambient light intensity from 0 lux to 5000 lux, according to an aspect of the disclosure. The graph 500 shows a signature of increased photon detection as depth of the silicon increases. In this example, diode D1 is only sensitive to blue photons so the current from D1 is less than the current from the other diodes. In this example, D2 is sensitive to blue photons and some green photons, so its current will be larger than the current of D1. In this example, diodes D3 and D4 are mostly sensitive to red photons and some green photons. As can be seen in the graph 500, the response to light intensity is fairly linear for all diodes across the tested range of intensity. This fact can simplify the method needed to determine the color components of ambient light based on a comparison of the diode currents, i.e., because the current ratios between the diodes does not change with varying light intensity.

Figure 6:
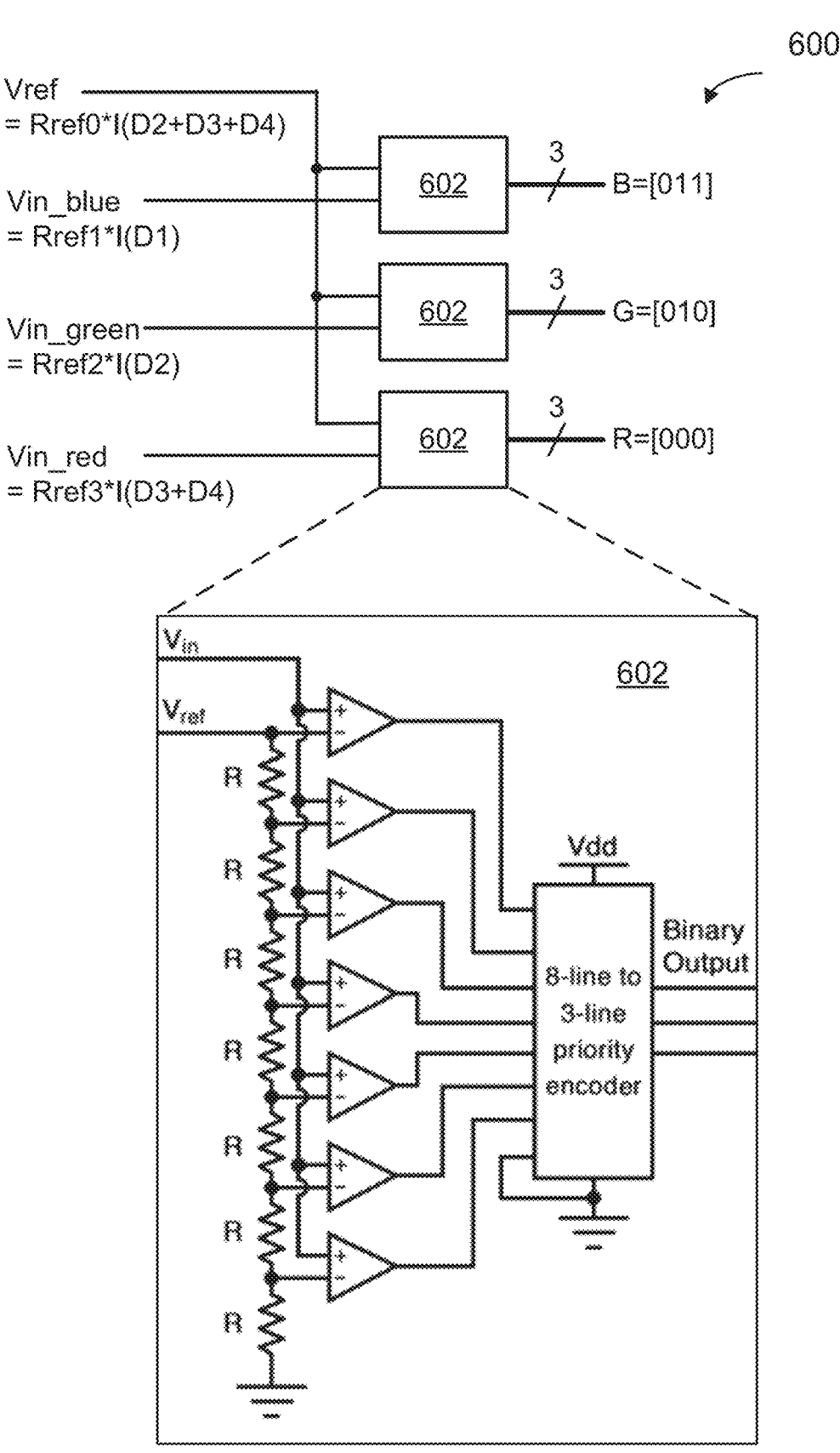
FIG. 6 is a schematic of an example circuit for determining the color components of ambient light using a compact photodiode with spectral resolution, according to an aspect of the disclosure.

FIG. 6 is a schematic of an example circuit 600 for determining the color components of ambient light, according to an aspect of the disclosure. The circuit 602 includes three 3-bit analog to digital converters (ADCs) 602. Each ADC 602 compares an input voltage to a common reverence voltage Vref that is generated by a product of the total current $I_{NBL}$ generated by diodes D2, D3, and D4 and a reference resistance Rref0. The input voltages correspond to currents detected by D1, by D2, and by the combination of D3 and D4. In the example shown in FIG. 6, the top ADC 602 compares Vref to Vin_blue, which is the product of the current through D1 and a reference resistance Rref1, the middle ADC 602 compares Vref to Vin_green, which is the product of the current through D2 and a reference resistance Rref2, and the bottom ADC 602 compares Vref to Vin_red, which is the product of the combined current through D3 and D4 and a reference resistance Rref3. In the example shown in FIG. 6, the blue component has a digital value of three, the green component has a digital value of two, and the red component has a digital value of zero.

One advantage of the circuit 600 is that the reference resistors can be fabricated from the same process (e.g., a CMOS process) that is used to fabricate the diodes. Another advantage of this circuit 600 is that the values of the reference resistors and the depths of the layers that make up the diodes can be adjusted as needed to fine tune the operation of the spectral detection. For example, in some aspects, each resistor R in the resistor tree within the ADC 602 may be the same value, which results in a linear relationship between the analog input and the digital output. In other aspects, each resistor R in the resistor tree within the ADC 602 may be half the value of the resistor above it or below it, to create an exponential or logarithmic relationship between the analog input and the digital output. It will be understood that the resistors in the resistor tree may be set to values to produce some other non-linear relationship between the analog input and the digital output. It will also be understood that the circuit 600 is illustrative and not limiting, i.e., other circuits may be used to perform the same or similar functions.

Figure 7:
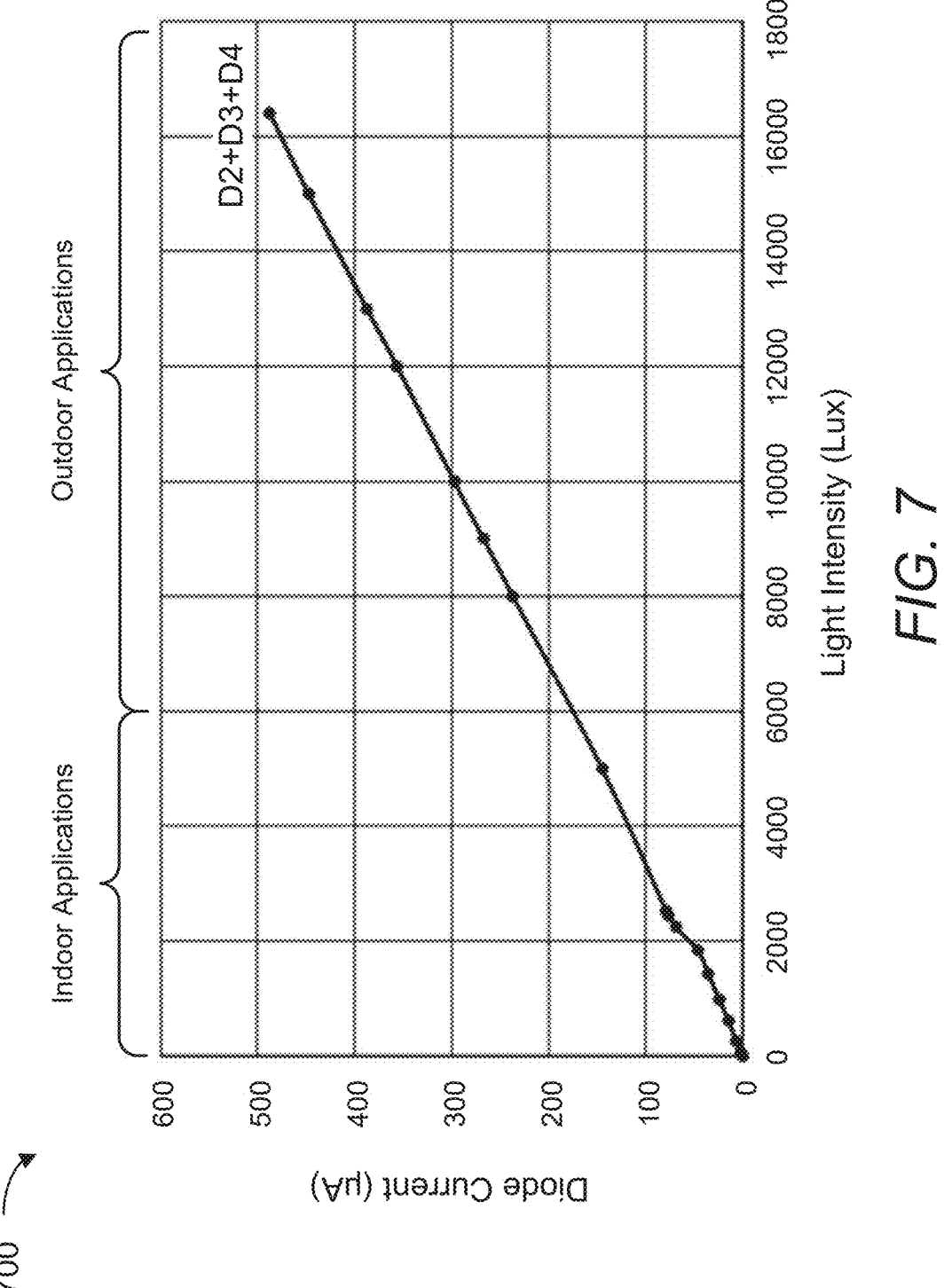
FIG. 7 is a graph showing the combined output of the multiple diodes of a compact photodiode with spectral resolution over a range of ambient light intensity, according to an aspect of the disclosure.

FIG. 7 is a graph 700 showing the combined output of diodes D2, D3, and D4 over a range of ambient light intensity from 0 lux to 16,500 lux, according to an aspect of the disclosure. As can be seen in the graph 700, a photodiode with the structure shown in FIGS. 2A and 2B exhibits a very linear response, both in the range typically needed for indoor applications and the range typically needed for outdoor applications. This allows an ALS to use just one photodiode 200 for both indoor and outdoor ambient light detection.

FIGS. 8A through 8C are plan views showing additional exemplary photodiode configurations, according to different aspects of the disclosure. FIG. 8A shows a 2×2 array 800 of smaller photodiodes 802, with central routing 804 for connection to diode terminals. FIG. 8B shows an arrangement 806 of hexagonal photodiodes 808. FIG. 8C shows an arrangement 810 of circular photodiodes 812. These configurations are illustrative and not limiting.

Figure 9A:
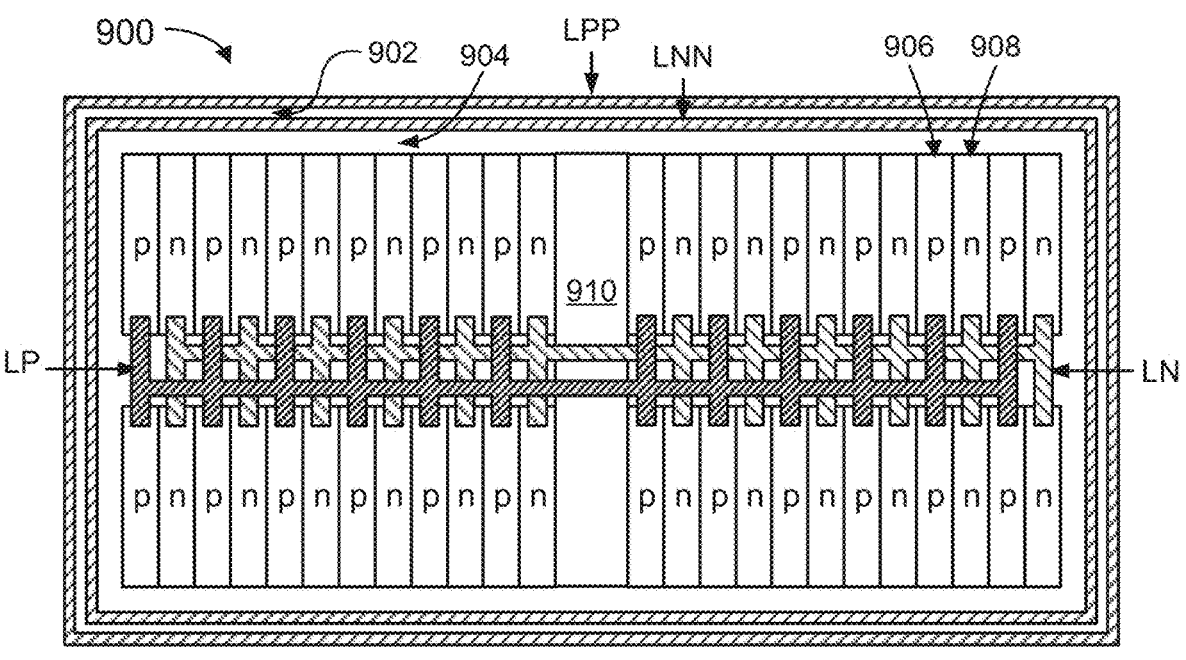
FIG. 9A and FIG. 9B are a cross-sectional view and a plan view, respectively, of a compact photodiode with spectral resolution, according to an aspect of the disclosure.
Figure 9B:
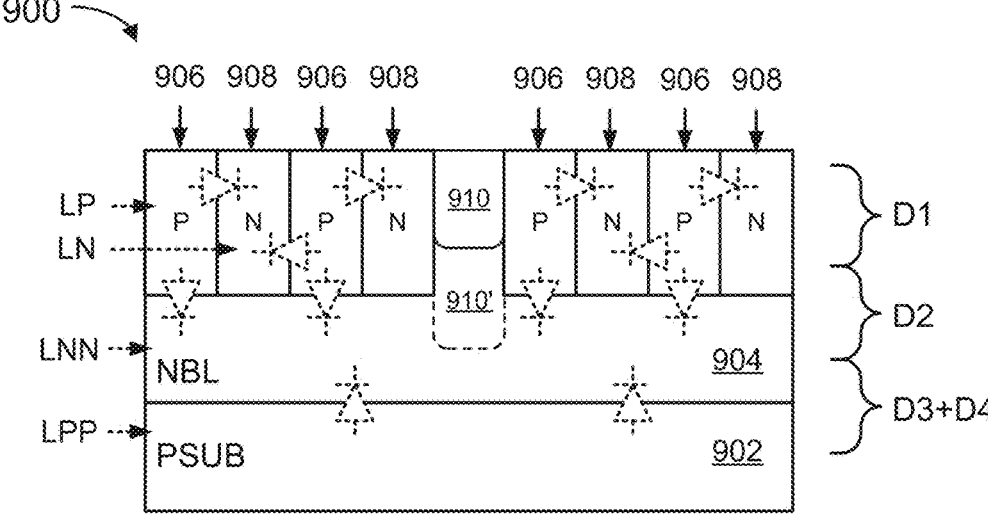

FIG. 9A and FIG. 9B are a cross-sectional view and a plan view, respectively, of a compact photodiode 900 with spectral resolution, according to an aspect of the disclosure. The photodiode 900 has a PSUB 902, above which is an NBL 904. P-doped regions 906 and n-doped regions 908 are interleaved side by side on top of the NBL 904. The p-doped regions 906 are electrically connected by contact LP, the n-doped regions 908 are electrically connected by contact LN, the NBL 904 is electrically connected to contact LNN, and the PSUB 902 is electrically connected to contact LPP. The photodiode 900 has lateral diodes D1 at the junctions between the p-doped regions 906 and the n-doped regions 908. This greatly increases the area of the diode D1 compared to the diode D1 in the photodiode 200 in FIG. 2A. The photodiode 900 has vertical diodes D2 at the junctions between the p-doped regions 906 and the NBL 904. The photodiode 900 has a vertical diode D3 at the junction of the bottom surface of the NBL 904 and the top surface of the PSUB 902. In some aspects, the photodiode 900 also has lateral diodes at the junctions of the sidewalls of the NBL 904 and the PSUB 902 (not shown in FIG. 9B). The additional lateral and vertical diodes enhance light sensitivity compared to the photodiode 200.

In some aspects, an isolation structure 910 may be disposed between sets of D1 (lateral) diodes. As illustrated in FIG. 9B, in some aspects, the isolation structure may be a shallow trench isolation (STI) structure 910, e.g., that extends to only a portion of the depth of the p-doped regions 906 and n-doped regions 908. In some aspects, the isolation structure may be a deep trench isolation (DTI) structure 910', e.g., that extends into the NBL 904 or even beyond the NBL 904 and into the PSUB 902. For example, an STI structure 910 may be used to separate groups of p- and n-doped regions that share common electrodes, while a DTI structure 910' may be used to separate one group of p- and n-doped regions that share a first set of common electrodes from another group of p- and n-doped regions that share a second set of common electrodes different from the first set of common electrodes, for example.

Figure 10A:
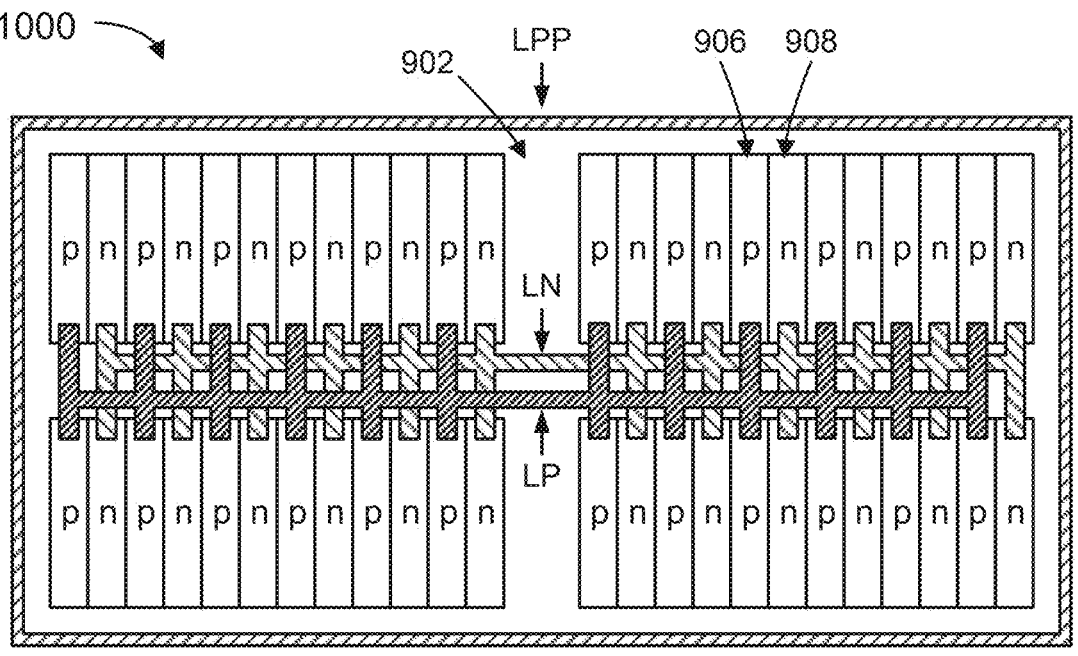
FIG. 10A and FIG. 10B are a cross-sectional view and a plan view, respectively, of a compact photodiode with spectral resolution, according to another aspect of the disclosure.
Figure 10B:
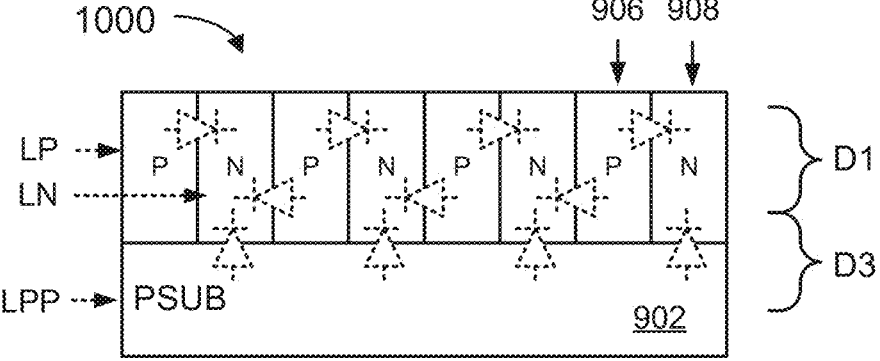

FIG. 10A and FIG. 10B are a cross-sectional view and a plan view, respectively, of a compact photodiode 1000 with spectral resolution, according to another aspect of the disclosure. The photodiode 1000 is similar in structure to the photodiode 900, having like elements with like numbers, the descriptions of which are not repeated here. For simplicity, isolation structures, such as STI structure 910 or DTI structure 910' in FIGS. 9A and 9B, are not shown in FIGS. 10A and 10B. Photodiode 1000 differs from photodiode 900 in that photodiode 1000 does not have an NBL 904 or its associated contact LNN. The photodiode 1000 has lateral diodes D1 at the junctions between the p-doped regions 906 and the n-doped regions 908. The photodiode 1000 has vertical diodes D3 at the junctions of the bottom surfaces of the n-doped regions 908 and the top surface of the PSUB 902. Here, too, the additional lateral and vertical diodes enhance light sensitivity compared to the photodiode 200.

Figure 11A:
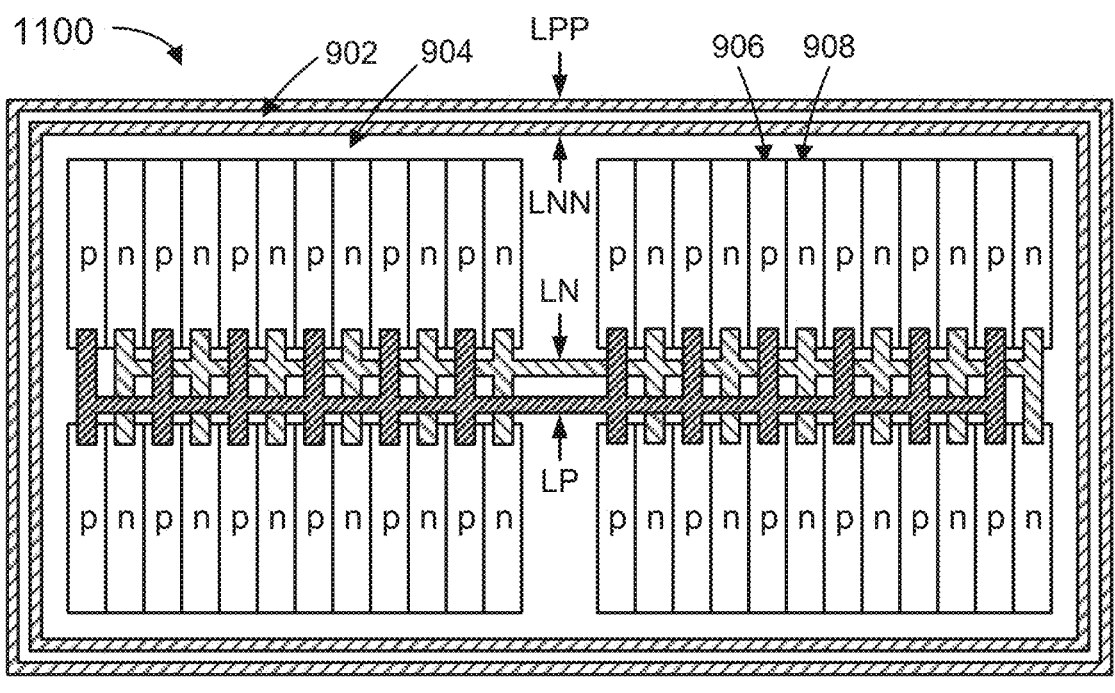
FIG. 11A and FIG. 11B are a cross-sectional view and a plan view, respectively, of a compact photodiode with spectral resolution, according to another aspect of the disclosure.
Figure 11B:
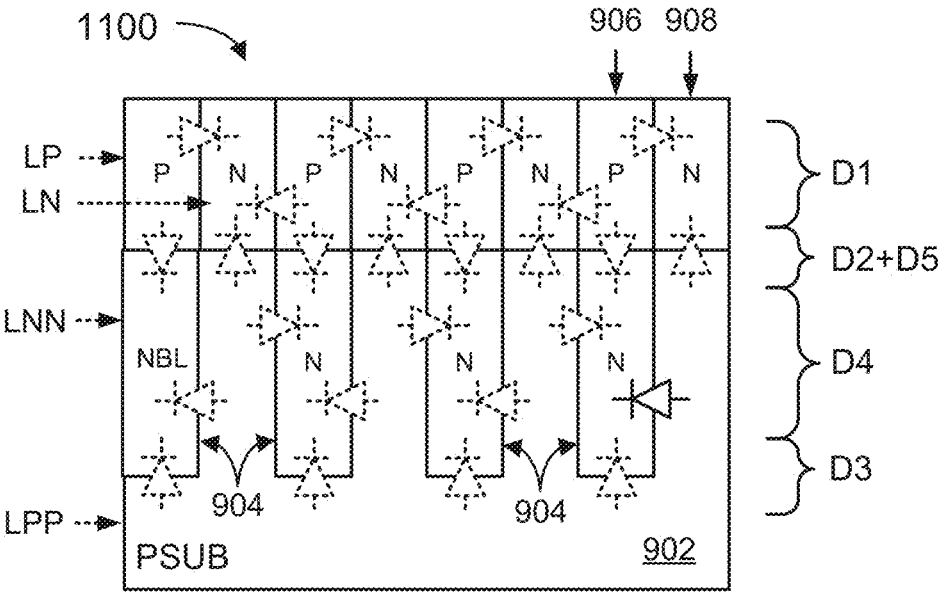

FIG. 11A and FIG. 11B are a cross-sectional view and a plan view, respectively, of a compact photodiode 1100 with spectral resolution, according to another aspect of the disclosure. The photodiode 1100 is similar in structure to the photodiode 900, having like elements with like numbers, the descriptions of which are not repeated here. For simplicity, isolation structures, such as STI structure 910 or DTI structure 910' in FIGS. 9A and 9B, are not shown in FIGS. 11A and 11B. Photodiode 1100 differs from photodiode 900 in that the surface area of the junction between the NBL 904 and the PSUB 902 is increased by interleaving the NBL 904 and the PSUB 902 horizontally, which creates a larger sidewall-to-sidewall area between the NBL 904 and the PSUB 902. The photodiode 1100 has lateral diodes D1 at the junctions between the p-doped regions 906 and the n-doped regions 908. The photodiode 1100 has vertical diodes D2 at the junctions between the p-doped regions 906 and the NBL 904. The photodiode 1100 has vertical diodes D3 at the junctions of the bottom surfaces of the NBL 904 and the top surface of the PSUB 902. The photodiode 1100 has lateral diodes D4 at the junctions of the sidewalls of the NBL 904 and the PSUB 902. The photodiode 1100 also has vertical diodes D5 at the junction between the bottom surfaces of the n-doped regions 908 and the top surface of the PSUB 902. Here, too, the additional lateral and vertical diodes enhance light sensitivity compared to the photodiode 200.

Figure 12A:
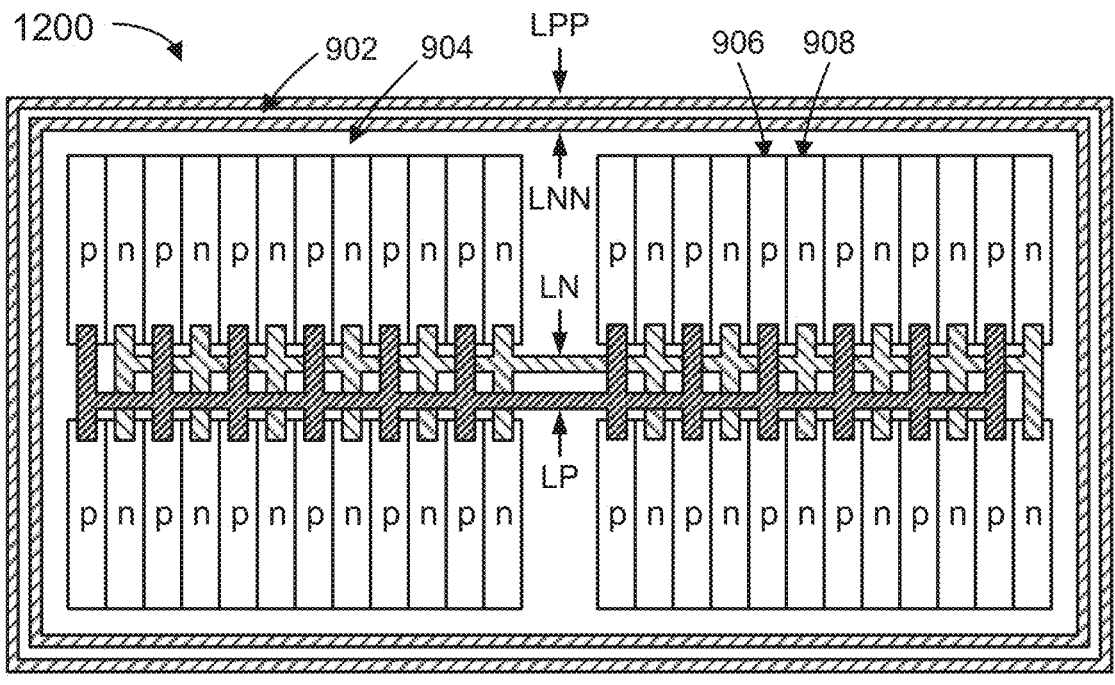
FIG. 12A and FIG. 12B are a cross-sectional view and a plan view, respectively, of a compact photodiode with spectral resolution, according to another aspect of the disclosure.
Figure 12B:
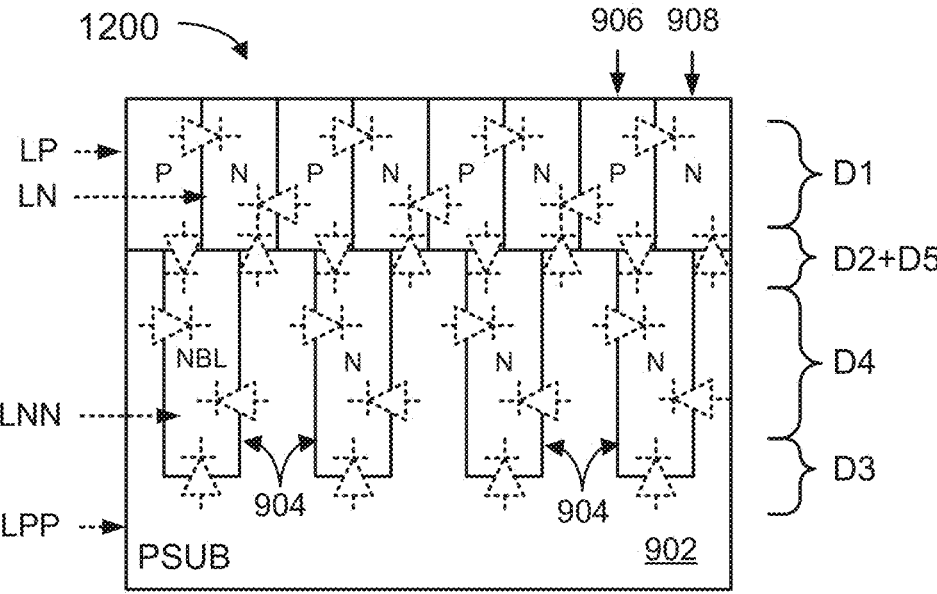

FIG. 12A and FIG. 12B are a cross-sectional view and a plan view, respectively, of a compact photodiode 1200 with spectral resolution, according to another aspect of the disclosure. The photodiode 1200 is similar in structure to the photodiode 1200, having like elements with like numbers, the descriptions of which are not repeated here. For simplicity, isolation structures, such as STI structure 910 or DTI structure 910' in FIGS. 9A and 9B, are not shown in FIGS. 12A and 12B. Photodiode 1100 differs from photodiode 1200 in that the NBL 904 areas are not aligned directly underneath the p-doped regions 906, but instead straddle the p-doped regions 906 and the n-doped regions 908. This has been found to improve the overall spectral detection efficiency.

Figure 13:
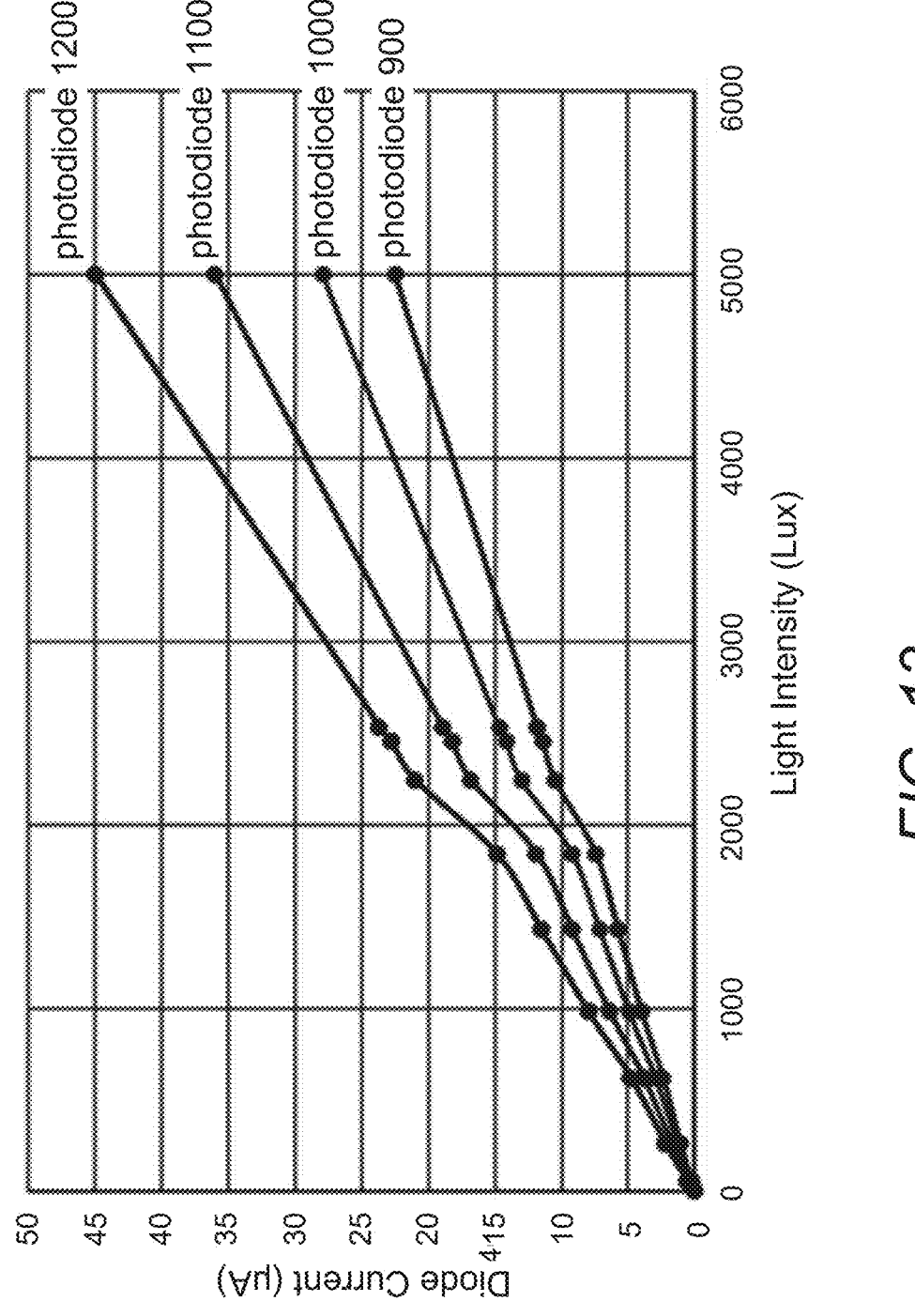
FIG. 13 is a graph 1300 showing a comparison of performance of various photodiode designs, according to aspects of the disclosure.

FIG. 13 is a graph 1300 showing a comparison of performance of photodiode 900, photodiode 1000, photodiode 1100, and photodiode 1200, according to aspects of the disclosure. As can be seen in FIG. 13, as the surface areas of the various diodes within each photodiode increased, the diode current also increased for the same intensity of ambient light, with photodiode 1200 having the highest output current for any given light intensity. Notably, the linearity of the responses did not change significantly across the various configurations.

Figure 14:
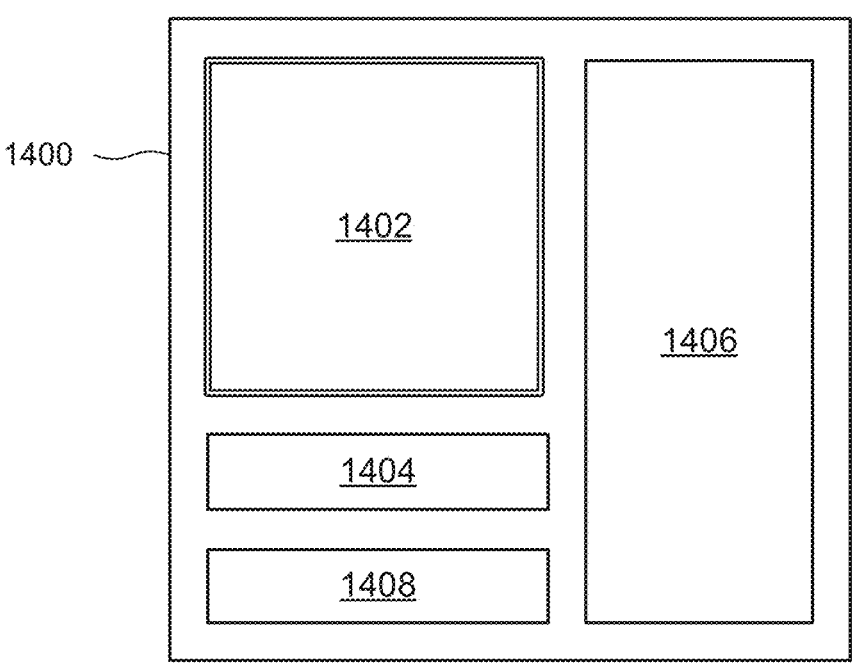
FIG. 14 is a block diagram of an example ambient light sensor that incorporates a compact photodiode according to an aspect of the disclosure.

FIG. 14 is a block diagram of an example ALS 1400 that incorporates a compact photodiode, according to an aspect of the disclosure. In the example illustrated in FIG. 14, the ALS 1400 includes a compact photodiode 1402 according to any to the compact photodiode designs described herein, at least one ADC 1404, control circuitry 1406, and an interface circuit 1408 (e.g., a serial bus controller, etc.). In some aspects, the compact photodiode 1402, the ADC 1404, the control circuitry 1406, and interface circuit 1408 may be fabricated on a single die, on chiplets that are combined onto a substrate, or in other configurations. In some aspects, the control circuitry 1406 controls the operation of the ALS 1400 and the components within it. For example, the control circuitry 1406 may control the ADC(s) 1404 to periodically generate a digital value for ambient light intensity and/or the spectral content (e.g., color component) of the ambient light, which is then transmitted to an ambient light data consumer via the interface circuit 1408. In some aspects, the operation of the ALS 1400 may be controlled via another entity that sends configuration and operation commands to the ALS 1400 via the interface circuit 1408.

Figure 15A:
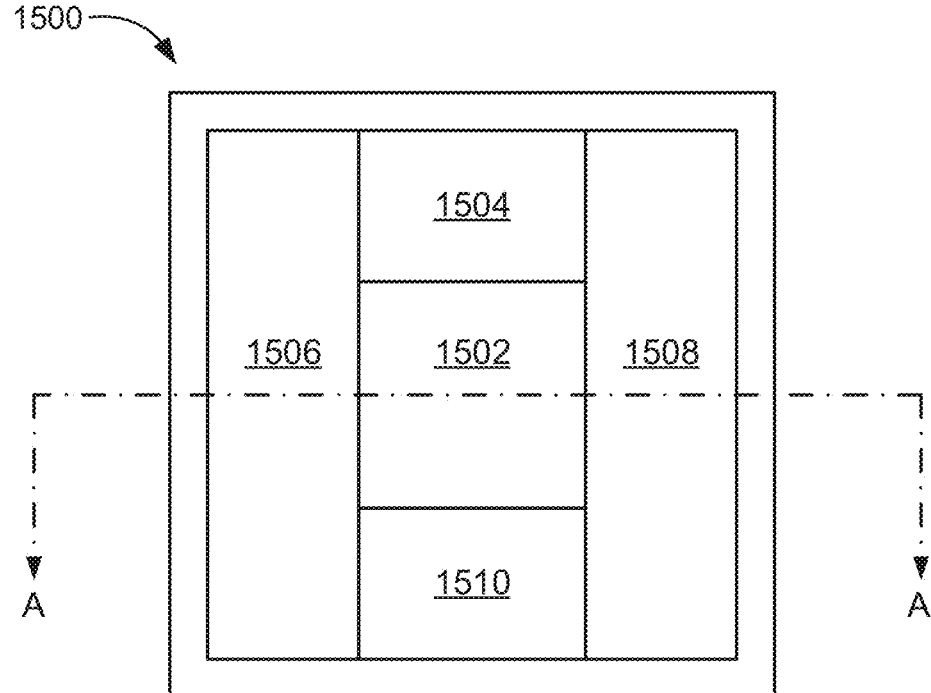
FIG. 15A is a simplified top view of an IC die that incorporates an example ambient light energy harvesting device, according to aspects of the disclosure.

FIG. 15A is a simplified top view of an ALS 1500 that incorporates an example photodiode, according to aspects of the disclosure. As shown in FIG. 15A, the ALS 1500 may include a photodiode 1502 (such as the photodiode 200 in FIGS. 2A-2B) may be formed. In some aspects, the ALS 1500 may include circuitry portions 1504, 1506, 1508, and 1510 where processing circuitry (which may include, for example, the ADC 1404, the control circuitry 1406, or the interface circuit 1408 shown in FIG. 14) may be formed. The specific content and arrangement of the circuitry portions 1504, 1506, 1508, and 1510 shown in FIG. 15A is illustrative and not limiting. In some aspects, the photodiode 1502 may be configured to receive the ambient light based on different approaches, as further illustrated by cross-sectional views of the ALS 1500 taken along the line A-A' in FIG. 15A.

Figure 15B:
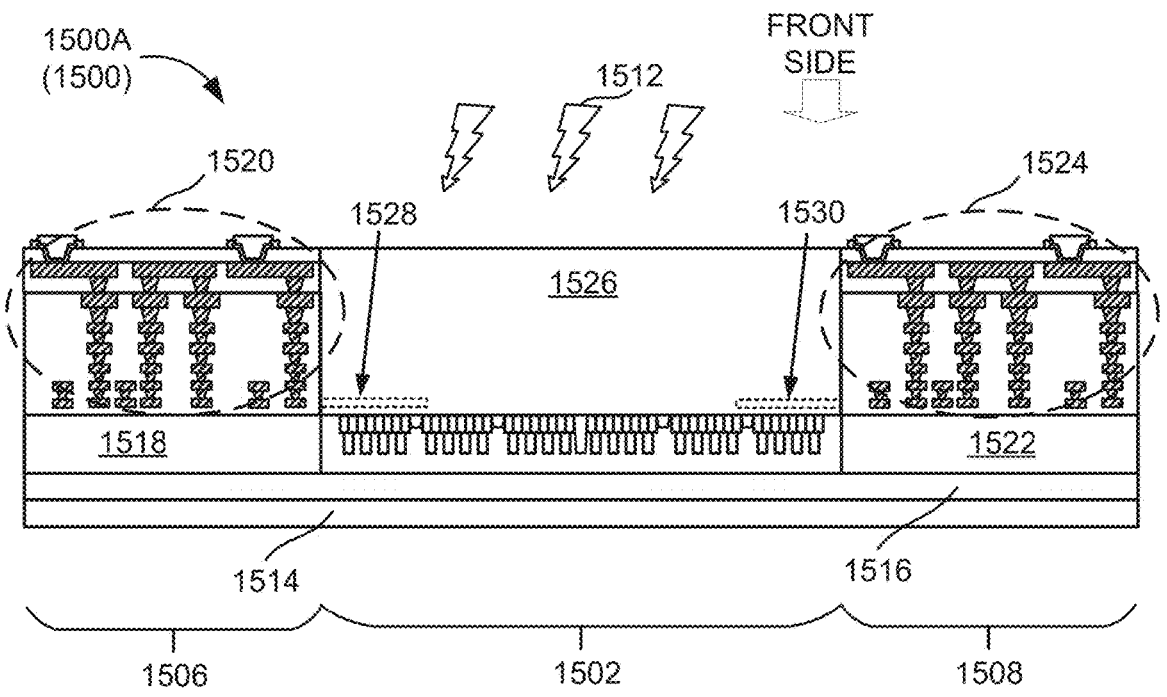
FIG. 15B is a simplified cross-sectional view of an IC die configured to receive ambient light based on a frontside illumination approach, according to aspects of the disclosure.

FIG. 15B is a simplified cross-sectional view of the ALS 1500A, which may correspond to configuring the ALS 1500 in FIG. 15A to receive the ambient light (e.g., the ambient light 1512) based on a frontside illumination approach, according to aspects of the disclosure. The components in FIG. 15B that are the same or similar to those in FIG. 15A may be given the same reference numbers, and a detailed description thereof may be omitted.

As shown in FIG. 15B, the ALS 1500A may include a photodiode 1502. In this non-limiting example, the photodiode 1502 may be based on the compact photodiode 200 in FIG. 2A or any of the examples, individually or in combination, illustrated in FIGS. 8A through 12B.

As shown in FIG. 15B, the ALS 1500A may include a substrate 1514 and a buried isolation layer 1516 on the substrate 1514. In some aspects, the circuitry portion 1506 may include a first front-end-of-line (FEOL) portion 1518 on the buried isolation layer 1516, and a first metallization portion 1520 on the first FEOL portion 1518. In some aspects, the circuitry portion 1508 may include a second FEOL portion 1522 on the buried isolation layer 1516, and a second metallization portion 1524 on the second FEOL portion 1522. In some aspects, the FEOL portions 1518 and 1522 may include electrical components and local conductive paths configured as various circuit blocks. In some aspects, the first and second metallization portions 1520 and 1524 may include layers of conductive traces and vias configured to connect the circuit blocks into corresponding functional devices, to provide a power distribution network (PDN) to the functional devices, and to provide terminal structures to be coupled to external components (e.g., a printed circuit board). In some aspects, the first and second metallization portions 1520 and 1524 may include copper traces and vias embedded in a dielectric material.

In some aspects, the photodiode 1502 may include a dielectric portion 1526 on the photodiode 1502 and may include conductive structures 1528 and 1530 electrically connecting the diodes of the photodiode 1502 and/or electrically connecting the photodiode 1502 to any of all of the circuitry portions 1504, 1506, 1508, and 1510. In some aspects, the conductive structures 1528 and 1530 may be formed as an extension of one or more lower conductive trace and/or via layers of the first metallization portion 1520 and/or the second metallization portion 1525. In some aspects, the dielectric portion 1526 may include a dielectric material, such as $SiO_2$ and/or fluorosilicate glass (FSG), that may allow the ambient light 1512 to reach the diodes of the photodiode 1502 from a front side (the direction labeled as "FRONT SIDE" in FIG. 15B) of the ALS 1500A.

Figure 15C:
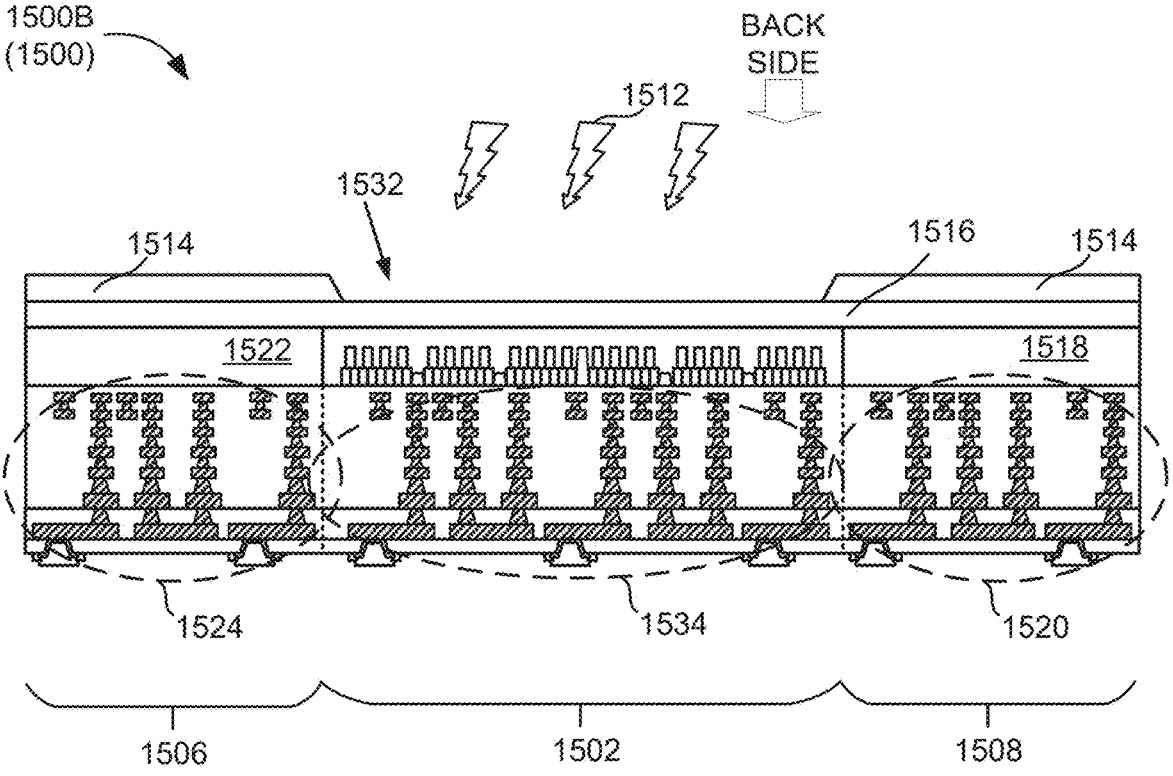
FIG. 15C is a simplified cross-sectional view of an IC die configured to receive ambient light based on a backside illumination approach, according to aspects of the disclosure.

FIG. 15C is a simplified cross-sectional view of the ALS 1500B, which may correspond to configuring the ALS 1500 in FIG. 15A to receive the ambient light (e.g., the ambient light 1512) based on a backside illumination approach, according to aspects of the disclosure. The components in FIG. 15C that are the same or similar to those in FIGS. 15A and 15B may be given the same reference numbers, and detail description thereof may be omitted.

Compared with the ALS 1500A in FIG. 15B, the ALS 1500B is depicted in an upside-down position, where a portion of the substrate 1514 may be removed (e.g., by an etching process) to define an opening 1532. In some aspects, the photodiode 1502 may include a third metallization portion 1534 that may be formed integrally with the first and second metallization portions 1520 and 1524. In some aspects, the buried isolation layer 1516 may include a dielectric material, such as SiO2 and/or FSG, that may allow the ambient light 1512 to reach the diodes of the photodiode 1502 from the back side (the direction labeled as "BACK SIDE" in FIG. 15C) of the ALS 1500B.

The compact photodiodes described herein provide at least the following advantages over the conventional photodiode structure 104 used in conventional ambient light sensors: the compact photodiodes have a footprint that is 1/10 the size of conventional photodiodes; the compact photodiodes can both detect the intensity of the full light spectrum and determine the spectral resolution of the ambient light without requiring filters.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. An ambient light sensor, comprising: a photodiode, comprising: a first n-doped layer; a first p-doped layer disposed below and in contact with the first n-doped layer; a second n-doped layer disposed below and in contact with the first p-doped layer; and a second p-doped layer disposed below and in contact with the second n-doped layer, wherein: a junction between the first n-doped layer and the first p-doped layer forms a first vertical diode; a junction between first p-doped layer and the second n-doped layer forms a second vertical diode; and a junction between the second n-doped layer and the second p-doped layer forms a third vertical diode and a first lateral diode.

Clause 2. The ambient light sensor of clause 1, wherein: the first vertical diode is most sensitive to light in a first range of wavelengths; the second vertical diode is most sensitive to light in a second range of wavelengths greater than the first range of wavelengths; and the third vertical diode and the first lateral diode are most sensitive to light in a third range of wavelengths greater than the second range of wavelengths.

Clause 3. The ambient light sensor of any of clauses 1 to 2, comprising a first terminal electrically coupled to the first n-doped layer, a second terminal electrically coupled to the first p-doped layer, a third terminal electrically coupled to the second n-doped layer, and a fourth terminal electrically coupled to the second p-doped layer.

Clause 4. The ambient light sensor of clause 3, further comprising control circuitry electrically coupled to the first terminal, the second terminal, the third terminal, and the fourth terminal of the photodiode, the control circuitry configured to: determine an intensity, spectral component, or both, of ambient light, based on currents produced by the first vertical diode, the second vertical diode, the third vertical diode, and the first lateral diode; and output a signal indicating a value of the intensity, spectral component, or both, of the ambient light.

Clause 5. The ambient light sensor of clause 4, wherein the control circuitry is configured to determine an intensity of the ambient light based on a total of the currents produced by at least one of the first vertical diode, the second vertical diode, the third vertical diode, and the first lateral diode.

Clause 6. The ambient light sensor of any of clauses 4 to 5, wherein the control circuitry is configured to determine a spectral component of the ambient light based on a comparison of the currents produced by at least two of the first vertical diode, the second vertical diode, the third vertical diode, and the first lateral diode.

Clause 7. The ambient light sensor of any of clauses 4 to 6, wherein the control circuitry comprises at least one analog-to-digital converter (ADC) to convert currents produced by at least one of the first vertical diode, the second vertical diode, the third vertical diode, and the first lateral diode into a digital value corresponding to the intensity, the spectral component, or both, of the ambient light.

Clause 8. The ambient light sensor of clause 7, wherein each of the at least one ADC determines a spectral component of the ambient light based on a comparison of: an input voltage corresponding to a current produced by at least one of the first vertical diode, the second vertical diode, the third vertical diode, and the first lateral diode; and a reference voltage corresponding to a total current produced by the second vertical diode, the third vertical diode, and the first lateral diode.

Clause 9. An ambient light sensor, comprising: a photodiode, comprising: a plurality of p-doped regions interleaved horizontally with a plurality of n-doped regions; an n-doped layer disposed below and in contact with the plurality of p-doped regions and the plurality of n-doped regions; and a p-doped layer disposed below and in contact with the n-doped layer, wherein: junctions between the plurality of p-doped regions and the plurality of n-doped regions form a first lateral diode; junctions between the plurality of p-doped regions and the n-doped layer form a first vertical diode; and a junction between the p-doped layer and the n-doped layer forms a second vertical diode and a second lateral diode.

Clause 10. The ambient light sensor of clause 9, wherein: the first lateral diode is most sensitive to light in a first range of wavelengths; the first vertical diode is most sensitive to light in a second range of wavelengths greater than the first range of wavelengths; and the second vertical diode and the second lateral diode are most sensitive to light in a third range of wavelengths greater than the second range of wavelengths.

Clause 11. The ambient light sensor of any of clauses 9 to 10, comprising a first terminal electrically coupled to the plurality of p-doped regions, a second terminal electrically coupled to the plurality of n-doped regions, a third terminal electrically coupled to the n-doped layer, and a fourth terminal electrically coupled to the p-doped layer.

Clause 12. The ambient light sensor of clause 11, further comprising control circuitry electrically coupled to the first terminal, the second terminal, the third terminal, and the fourth terminal of the photodiode, the control circuitry configured to: determine an intensity, spectral component, or both, of ambient light, based on currents produced by the first lateral diode, the first vertical diode, the second vertical diode, and the second lateral diode; and output a signal indicating a value of the intensity, spectral component, or both, of the ambient light.

Clause 13. The ambient light sensor of clause 12, wherein the control circuitry is configured to determine an intensity of the ambient light based on a total of the currents produced by at least one of the first lateral diode, the first vertical diode, the second vertical diode, and the second lateral diode.

Clause 14. The ambient light sensor of any of clauses 12 to 13, wherein the control circuitry is configured to determine a spectral component of the ambient light based on a comparison of the currents produced by at least two of the first lateral diode, the first vertical diode, the second vertical diode, and the second lateral diode.

Clause 15. The ambient light sensor of any of clauses 12 to 14, wherein the control circuitry comprises at least one ADC to convert currents produced by at least one of the first lateral diode, the first vertical diode, the second vertical diode, and the second lateral diode into a digital value corresponding to the intensity, the spectral component, or both, of the ambient light.

Clause 16. An ambient light sensor, comprising: a photodiode, comprising: a first plurality of p-doped regions interleaved horizontally with a first plurality of n-doped regions; and a second plurality of p-doped regions below and in contact with the first plurality of n-doped regions and interleaved with a second plurality of n-doped regions below and in contact with the first plurality of p-doped regions, wherein: junctions between the first plurality of p-doped regions and the first plurality of n-doped regions form a first lateral diode; junctions between the second plurality of p-doped regions and the second plurality of n-doped regions form a second lateral diode; junctions between the first plurality of p-doped regions and the second plurality of n-doped regions form a first vertical diode; and junctions between the second plurality of p-doped regions and the first plurality of n-doped regions form a second vertical diode.

Clause 17. The ambient light sensor of clause 16, wherein: the first lateral diode is most sensitive to light in a first range of wavelengths; the first vertical diode and the second lateral diode are most sensitive to light in a second range of wavelengths greater than the first range of wavelengths; and the second vertical diode is most sensitive to light in a third range of wavelengths greater than the second range of wavelengths.

Clause 18. The ambient light sensor of any of clauses 16 to 17, wherein a portion of each of the n-doped regions in the second plurality of n-doped regions is in contact with one of the n-doped regions in the first plurality of n-doped regions, and wherein a portion of each of the p-doped regions in the second plurality of p-doped regions is in contact with one of the p-doped regions in the first plurality of p-doped regions.

Clause 19. The ambient light sensor of any of clauses 16 to 18, comprising a first terminal electrically coupled to the first plurality of p-doped regions, a second terminal electrically coupled to the first plurality of n-doped regions, a third terminal electrically coupled to the second plurality of p-doped regions, and a fourth terminal electrically coupled to the second plurality of n-doped regions.

Clause 20. The ambient light sensor of clause 19, further comprising control circuitry electrically coupled to the first terminal, the second terminal, the third terminal, and the fourth terminal of the photodiode, the control circuitry configured to: determine an intensity, spectral component, or both, of ambient light, based on currents produced by the first lateral diode, the second lateral diode, the first vertical diode, and the second vertical diode; and output a signal indicating a value of the intensity, spectral component, or both, of the ambient light.

Clause 21. The ambient light sensor of clause 20, wherein the control circuitry is configured to determine an intensity of the ambient light based on a total of the currents produced by at least one of the first lateral diode, the second lateral diode, the first vertical diode, and the second vertical diode.

Clause 22. The ambient light sensor of any of clauses 20 to 21, wherein the control circuitry is configured to determine a spectral component of the ambient light based on a comparison of the currents produced by at least two of the first lateral diode, the second lateral diode, the first vertical diode, and the second vertical diode.

Clause 23. The ambient light sensor of any of clauses 20 to 22, wherein the control circuitry comprises at least one ADC to convert currents produced by at least one of the first lateral diode, the second lateral diode, the first vertical diode, and the second vertical diode into a digital value corresponding to the intensity, the spectral component, or both, of the ambient light.

Clause 24. An ambient light sensor, comprising: a photodiode, comprising: a plurality of p-doped regions interleaved horizontally with a plurality of n-doped regions; and a p-doped layer disposed below and in contact with the plurality of p-doped regions and the plurality of n-doped regions; wherein: junctions between the plurality of p-doped regions and the plurality of n-doped regions form a lateral diode; and junctions between the plurality of n-doped regions and the p-doped layer form a vertical diode.

Clause 25. The ambient light sensor of clause 24, wherein: the lateral diode is most sensitive to light in a first range of wavelengths; and the vertical diode is most sensitive to light in a second range of wavelengths greater than the first range of wavelengths.

Clause 26. The ambient light sensor of any of clauses 24 to 25, comprising a first terminal electrically coupled to the plurality of p-doped regions, a second terminal electrically coupled to the plurality of n-doped regions, and a third terminal electrically coupled to the p-doped layer.

Clause 27. The ambient light sensor of clause 26, further comprising control circuitry electrically coupled to the first terminal, the second terminal, and the third terminal of the photodiode, the control circuitry configured to: determine an intensity, spectral component, or both, of ambient light, based on currents produced by the lateral diode and the vertical diode; and output a signal indicating a value of the intensity, spectral component, or both, of the ambient light.

Clause 28. The ambient light sensor of clause 27, wherein the control circuitry is configured to determine an intensity of the ambient light based on a total of the currents produced by at least one of the lateral diode and the vertical diode.

Clause 29. The ambient light sensor of any of clauses 27 to 28, wherein the control circuitry is configured to determine a spectral component of the ambient light based on a comparison of the currents produced by at least two of the lateral diode and the vertical diode.

Clause 30. The ambient light sensor of any of clauses 27 to 29, wherein the control circuitry comprises at least one ADC to convert currents produced by at least one of the lateral diode and the vertical diode into a digital value corresponding to the intensity, the spectral component, or both, of the ambient light.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. An ambient light sensor, comprising:
a photodiode, comprising:
  a first n-doped layer;
  a first p-doped layer disposed below and in contact with the first n-doped layer and forming a first vertical diode;
  a second n-doped layer disposed below and in contact with the first p-doped layer and forming a second vertical diode;
  a second p-doped layer disposed below and in contact with the second n-doped layer and forming a third vertical diode and a first lateral diode;
  a first terminal electrically coupled to the first n-doped layer;
  a second terminal electrically coupled to the first p-doped layer;
  a third terminal electrically coupled to the second n-doped layer;
  a fourth terminal electrically coupled to the second p-doped layer; and
  control circuitry electrically coupled to the first terminal, the second terminal, the third terminal, and the fourth terminal of the photodiode, the control circuitry configured to use the photodiode to sense ambient light with spectral resolution.

2. The ambient light sensor of claim 1, wherein:
the first vertical diode is most sensitive to light in a first range of wavelengths;
the second vertical diode is most sensitive to light in a second range of wavelengths greater than the first range of wavelengths; and
the third vertical diode and the first lateral diode are most sensitive to light in a third range of wavelengths greater than the second range of wavelengths.

3. The ambient light sensor of claim 1, wherein, to use the photodiode to sense ambient light with spectral resolution, the control circuitry is configured to:

determine an intensity, spectral component, or both, of ambient light, based on currents produced by the first vertical diode, the second vertical diode, the third vertical diode, and the first lateral diode; and output a signal indicating a value of the intensity, spectral component, or both, of the ambient light.

4. The ambient light sensor of claim 3, wherein the control circuitry is configured to determine an intensity of the ambient light based on a total of the currents produced by at least one of the first vertical diode, the second vertical diode, the third vertical diode, and the first lateral diode.

5. The ambient light sensor of claim 3, wherein the control circuitry is configured to determine a spectral component of the ambient light based on a comparison of the currents produced by at least two of the first vertical diode, the second vertical diode, the third vertical diode, and the first lateral diode.

6. The ambient light sensor of claim 3, wherein the control circuitry comprises at least one analog-to-digital converter (ADC) to convert currents produced by at least one of the first vertical diode, the second vertical diode, the third vertical diode, and the first lateral diode into a digital value corresponding to the intensity, the spectral component, or both, of the ambient light.

7. The ambient light sensor of claim 6, wherein each of the at least one ADC determines a spectral component of the ambient light based on a comparison of:

an input voltage corresponding to a current produced by at least one of the first vertical diode, the second vertical diode, the third vertical diode, and the first lateral diode; and a reference voltage corresponding to a total current produced by the second vertical diode, the third vertical diode, and the first lateral diode.

8. An ambient light sensor, comprising:

a photodiode, comprising:

a plurality of p-doped regions interleaved horizontally with a plurality of n-doped regions, the junctions between the plurality of p-doped regions and the plurality of n-doped regions forming a first lateral diode;

an n-doped layer disposed below and in contact with the plurality of p-doped regions and the plurality of n-doped regions, the junctions between the plurality of p-doped regions and the n-doped layer forming a first vertical diode;

a p-doped layer disposed below and in contact with the n-doped layer, the junction the p-doped layer and the n-doped layer forming a second vertical diode and a second lateral diode;

a first terminal electrically coupled to the plurality of p-doped regions;

a second terminal electrically coupled to the plurality of n-doped regions;

a third terminal electrically coupled to the n-doped layer;

and a fourth terminal electrically coupled to the p-doped layer; and control circuitry electrically coupled to the first terminal, the second terminal, the third terminal, and the fourth terminal of the photodiode, the control circuitry configured to use the photodiode to sense ambient light with spectral resolution.

9. The ambient light sensor of claim 8, wherein:

the first lateral diode is most sensitive to light in a first range of wavelengths;

the first vertical diode is most sensitive to light in a second range of wavelengths greater than the first range of wavelengths; and the second vertical diode and the second lateral diode are most sensitive to light in a third range of wavelengths greater than the second range of wavelengths.

10. The ambient light sensor of claim 8, wherein, to use the photodiode to sense ambient light with spectral resolution, the control circuitry is configured to:

determine an intensity, spectral component, or both, of ambient light, based on currents produced by the first lateral diode, the first vertical diode, the second vertical diode, and the second lateral diode; and output a signal indicating a value of the intensity, spectral component, or both, of the ambient light.

11. The ambient light sensor of claim 10, wherein the control circuitry is configured to determine an intensity of the ambient light based on a total of the currents produced by at least one of the first lateral diode, the first vertical diode, the second vertical diode, and the second lateral diode.

12. The ambient light sensor of claim 10, wherein the control circuitry is configured to determine a spectral component of the ambient light based on a comparison of the currents produced by at least two of the first lateral diode, the first vertical diode, the second vertical diode, and the second lateral diode.

13. The ambient light sensor of claim 10, wherein the control circuitry comprises at least one analog-to-digital converter (ADC) to convert currents produced by at least one of the first lateral diode, the first vertical diode, the second vertical diode, and the second lateral diode into a digital value corresponding to the intensity, the spectral component, or both, of the ambient light.

14. An ambient light sensor, comprising:

a photodiode, comprising:

a first plurality of p-doped regions interleaved horizontally with a first plurality of n-doped regions, the junctions between the first plurality of p-doped regions and the first plurality of n-doped regions forming a first lateral diode; and a second plurality of p-doped regions below and in contact with the first plurality of n-doped regions and interleaved with a second plurality of n-doped regions below and in contact with the first plurality of p-doped regions, the junctions between the second plurality of p-doped regions and the second plurality of n-doped regions forming a second lateral diode, the junctions between the first plurality of p-doped regions and the second plurality of n-doped regions forming a first vertical diode, and the junctions between the second plurality of p-doped regions and the first plurality of n-doped regions forming a second vertical diode;

a first terminal electrically coupled to the first plurality of p-doped regions;

a second terminal electrically coupled to the first plurality of n-doped regions;

a third terminal electrically coupled to the second plurality of p-doped regions;

a fourth terminal electrically coupled to the second plurality of n-doped regions; and control circuitry electrically coupled to the first terminal, the second terminal, the third terminal, and the fourth terminal of the photodiode, the control circuitry configured to use the photodiode to sense ambient light with spectral resolution.

15. The ambient light sensor of claim 14, wherein:

the first lateral diode is most sensitive to light in a first range of wavelengths;

the first vertical diode and the second lateral diode are most sensitive to light in a second range of wavelengths greater than the first range of wavelengths; and the second vertical diode is most sensitive to light in a third range of wavelengths greater than the second range of wavelengths.

16. The ambient light sensor of claim 14, wherein a portion of each of the n-doped regions in the second plurality of n-doped regions is in contact with one of the n-doped regions in the first plurality of n-doped regions, and wherein a portion of each of the p-doped regions in the second plurality of p-doped regions is in contact with one of the p-doped regions in the first plurality of p-doped regions.

17. The ambient light sensor of claim 14, wherein, to use the photodiode to sense ambient light with spectral resolution, the control circuitry is configured to:

determine an intensity, spectral component, or both, of ambient light, based on currents produced by the first lateral diode, the second lateral diode, the first vertical diode, and the second vertical diode; and output a signal indicating a value of the intensity, spectral component, or both, of the ambient light.

18. The ambient light sensor of claim 17, wherein the control circuitry is configured to determine an intensity of the ambient light based on a total of the currents produced by at least one of the first lateral diode, the second lateral diode, the first vertical diode, and the second vertical diode.

19. The ambient light sensor of claim 17, wherein the control circuitry is configured to determine a spectral component of the ambient light based on a comparison of the currents produced by at least two of the first lateral diode, the second lateral diode, the first vertical diode, and the second vertical diode.

20. The ambient light sensor of claim 17, wherein the control circuitry comprises at least one analog-to-digital converter (ADC) to convert currents produced by at least one of the first lateral diode, the second lateral diode, the first vertical diode, and the second vertical diode into a digital value corresponding to the intensity, the spectral component, or both, of the ambient light.

21. An ambient light sensor, comprising:

a photodiode, comprising:

a plurality of p-doped regions interleaved horizontally with a plurality of n-doped regions, the junctions between the plurality of p-doped regions and the plurality of n-doped regions forming a lateral diode; and a p-doped layer disposed below and in contact with the plurality of p-doped regions and the plurality of n-doped regions the junctions between the plurality of n-doped regions and the p-doped layer forming a vertical diode;

a first terminal electrically coupled to the plurality of p-doped regions;

a second terminal electrically coupled to the plurality of n-doped regions;

a third terminal electrically coupled to the p-doped layer; and control circuitry electrically coupled to the first terminal, the second terminal, and the third terminal of the photodiode, the control circuitry configured to use the photodiode to sense ambient light with spectral resolution.

22. The ambient light sensor of claim 21, wherein:

the lateral diode is most sensitive to light in a first range of wavelengths; and the vertical diode is most sensitive to light in a second range of wavelengths greater than the first range of wavelengths.

23. The ambient light sensor of claim 21, wherein, to use the photodiode to sense ambient light with spectral resolution, the control circuitry is configured to:

determine an intensity, spectral component, or both, of ambient light, based on currents produced by the lateral diode and the vertical diode; and output a signal indicating a value of the intensity, spectral component, or both, of the ambient light.

24. The ambient light sensor of claim 23, wherein the control circuitry is configured to determine an intensity of the ambient light based on a total of the currents produced by at least one of the lateral diode and the vertical diode.

25. The ambient light sensor of claim 23, wherein the control circuitry is configured to determine a spectral component of the ambient light based on a comparison of the currents produced by at least two of the lateral diode and the vertical diode.

26. The ambient light sensor of claim 23, wherein the control circuitry comprises at least one analog-to-digital converter (ADC) to convert currents produced by at least one of the lateral diode and the vertical diode into a digital value corresponding to the intensity, the spectral component, or both, of the ambient light.

* * * * *